(12) United States Patent
Tang et al.

(10) Patent No.: US 10,745,516 B2
(45) Date of Patent: Aug. 18, 2020

(54) NARROW-RANGE POLYACETYLENE ESTER COMPOUND AND PREPARATION METHOD THEREFOR

(71) Applicant: South China University of Technology, Guangzhou (CN)

(72) Inventors: Ben Zhong Tang, Guangzhou (CN); Bo Song, Guangzhou (CN); Anjun Qin, Guangzhou (CN); Zujin Zhao, Guangzhou (CN); Rongrong Hu, Guangzhou (CN)

(73) Assignee: South China University of Technology (CN)

( * ) Notice: Subject to any disclaimer, the term of this patent is extended or adjusted under 35 U.S.C. 154(b) by 85 days.

(21) Appl. No.: 16/093,276

(22) PCT Filed: Mar. 15, 2017

(86) PCT No.: PCT/CN2017/076697
§ 371 (c)(1),
(2) Date: Oct. 12, 2018

(87) PCT Pub. No.: WO2018/076595
PCT Pub. Date: May 3, 2018

(65) Prior Publication Data
US 2019/0127518 A1    May 2, 2019

(30) Foreign Application Priority Data
Oct. 28, 2016    (CN) .......................... 2016 1 0973824

(51) Int. Cl.
*C08G 61/12*    (2006.01)
*C08G 63/81*    (2006.01)
*C08G 63/83*    (2006.01)

(52) U.S. Cl.
CPC ......... *C08G 61/127* (2013.01); *C08G 61/123* (2013.01); *C08G 2261/124* (2013.01);
(Continued)

(58) Field of Classification Search
CPC .... C08G 61/121; C08G 61/127; C08G 63/81; C08G 63/83; C08G 2261/312;
(Continued)

(56) References Cited

U.S. PATENT DOCUMENTS 5,840,820 A    11/1998    DeSimone et al.

FOREIGN PATENT DOCUMENTS

CN    104817691 A    8/2015
WO    9632421    10/1996

OTHER PUBLICATIONS

Chan et al., "Construction of Funtional Macromolecules with Well-Defined Structures by Indium-Catalyzed Three-Component Polycoupling of Alkynes, Aldehydes, and Amines", Macromolecules, 2013, pp. 3246-3256, vol. 46.
(Continued)

*Primary Examiner* — Vu A Nguyen
(74) *Attorney, Agent, or Firm* — The Webb Law Firm

(57) ABSTRACT

Provided herein is a narrow-range polyacetylene ester compound and a preparation method. The narrow-range polyacetylene ester compound has a structural formula as represented by formula (I). The method includes: in atmospheric carbon dioxide environment, a bifunctional alkyne monomer, carbon dioxide, and a dihalide monomer perform polymerization reaction by means of a combined action of a catalyzer and alkali, dissolve the product into an
(Continued)

organic solvent, then add same to a precipitant for precipitation, collect precipitates, and dry same to the constant weight to obtain the narrow-range polyacetylene ester compound. The reaction is carried out in atmospheric carbon dioxide atmosphere, and carbon dioxide is involved as a monomer in the formation of a polymer. The obtained narrow-range polyacetylene ester compound has good thermal stability and excellent processability. Due to introduction of an aggregation-induced emission group, some polymers show a typical aggregation-induced emission performance.

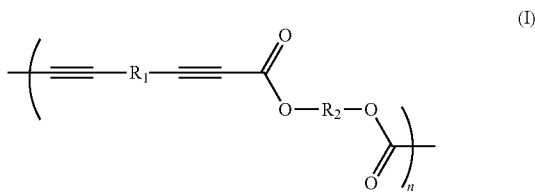

(I)

7 Claims, 10 Drawing Sheets

(52) U.S. Cl.
CPC . *C08G 2261/1644* (2013.01); *C08G 2261/22* (2013.01); *C08G 2261/312* (2013.01); *C08G 2261/334* (2013.01); *C08G 2261/3326* (2013.01); *C08G 2261/3328* (2013.01); *C08G 2261/342* (2013.01); *C08G 2261/344* (2013.01); *C08G 2261/3422* (2013.01); *C08G 2261/592* (2013.01)

(58) Field of Classification Search
CPC ........ C08G 2261/314; C08G 2261/316; C08G 2261/3328
See application file for complete search history.

(56) References Cited

OTHER PUBLICATIONS

Li et al., "Catalyst-Free, Atom-Economic, Multicomponent Polymerizations of Aromatic Diynes, Elemental Sulfur, and Aliphatic Diamines toward Luminescent Polythioamides", Macromolecules, 2015, pp. 7747-7754, vol. 48.

NARROW-RANGE POLYACETYLENE ESTER COMPOUND AND PREPARATION METHOD THEREFOR

CROSS-REFERENCE TO RELATED APPLICATION

This application is the United States national phase of International Application No. PCT/CN2017/076697 filed Mar. 15, 2017, and claims priority to Chinese Patent Application No. 201610973824.6 filed Oct. 28, 2016, the disclosures of which are hereby incorporated in their entirety by reference.

FIELD OF THE INVENTION

The present invention belongs to the technical field of organic synthesis, and in particular relates to a narrow-range polyacetylene ester compound and a preparation method therefor.

BACKGROUND OF THE INVENTION

Since the continued growth of carbon dioxide in the atmosphere has caused many climate problems, carbon dioxide has now attracted widespread attention around the world. There are two ways to reduce the concentration of carbon dioxide in the atmosphere, one of which is to store carbon dioxide physically, and the other is to convert carbon dioxide chemically. It is well known that carbon dioxide is an abundant-rich, inexpensive, non-toxic and renewable C1 monomer, and therefore converting carbon dioxide into some useful materials is a more advocated practice. However, due to the lower reactivity of carbon dioxide, its application in the field of chemical synthesis has been greatly limited. There are currently very few polymerizations that make efficient use of carbon dioxide, in which the most famous one and also the most widely studied one in the world is the copolymerization of carbon dioxide and epoxy compounds; although this copolymerization is highly reactive, it has a number of unavoidable disadvantages such as harsh reaction conditions, complex catalyzers, and inflexibility of monomer design, such that it fails to achieve the diverse properties of polymers. Others such as copolymerization of carbon dioxide and glycol, copolymerization of carbon dioxide, glycol and dihalide, and the like are not highly reactive.

The development of new alkyne-based polymerizations is very important for polymer materials science. Alkynes are one of the readily available or easily synthesized chemical materials. The use of alkynes to construct functional polymers has important academic and technical significance and has attracted wide attention of scientists. However, there have been few reports on the copolymerization of alkynes and carbon dioxide.

SUMMARY OF THE INVENTION

In order to overcome the above disadvantages and deficiencies of the prior art, it is a primary object of the present invention to provide a narrow-range polyacetylene ester compound and a preparation method therefor. The preparation method can be carried out in atmospheric carbon dioxide atmosphere, and carbon dioxide is involved as a monomer in the formation of a polymer, with the reaction environmentally protective, efficient, and easy to handle.

Another object of the present invention is to provide a narrow-range polyacetylene ester compound that is prepared by the above method.

The objects of the present invention are achieved by the following technical solution:

A method for preparing a narrow-range polyacetylene ester compound is provided, comprising the following steps:

(1) In atmospheric carbon dioxide atmosphere, a bifunctional alkyne monomer, carbon dioxide, and a dihalide monomer are polymerized by means of a combined action of a catalyzer and base in an organic solvent; and (2) after the reaction is completed, the product is added to a precipitant for precipitation, and the precipitate is collected and dried to a constant weight to obtain a narrow-range polyacetylene ester compound.

The bifunctional alkyne monomer has a structural formula as represented by formula (II):

(II)

The dihalide monomer has a structural formula as represented by formula (III):

$$X-R_2-X \quad X=Cl, Br, I \quad (III)$$

wherein $R_1$ and $R_2$ are an organic group.

Preferably, $R_1$ is any one of the following organic groups of 1 to 26, and $R_2$ is any one of the following organic groups of 27 to 29.

1

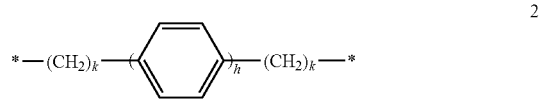

2

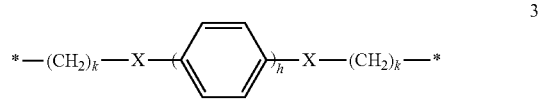

3

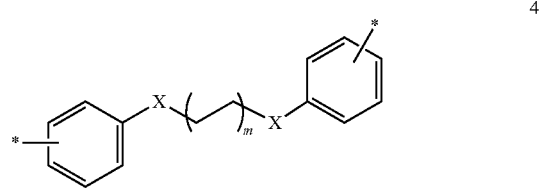

4

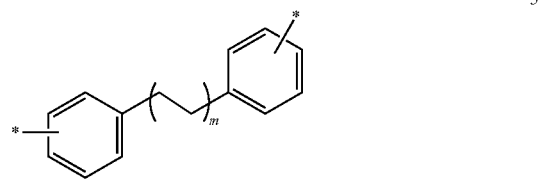

5

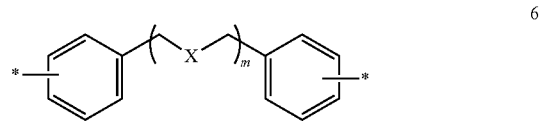

6

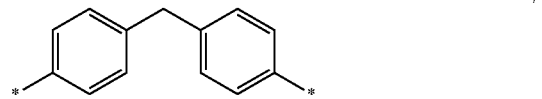

7

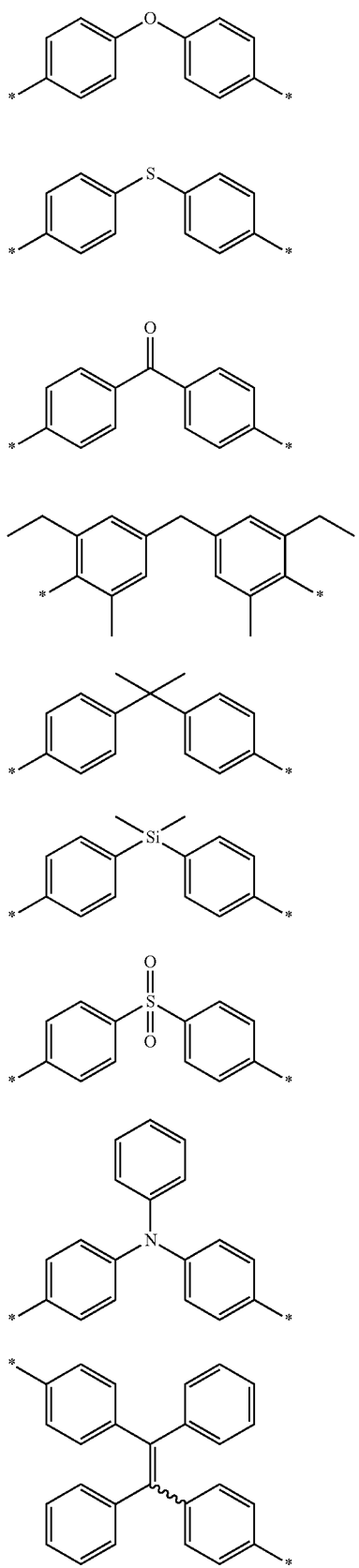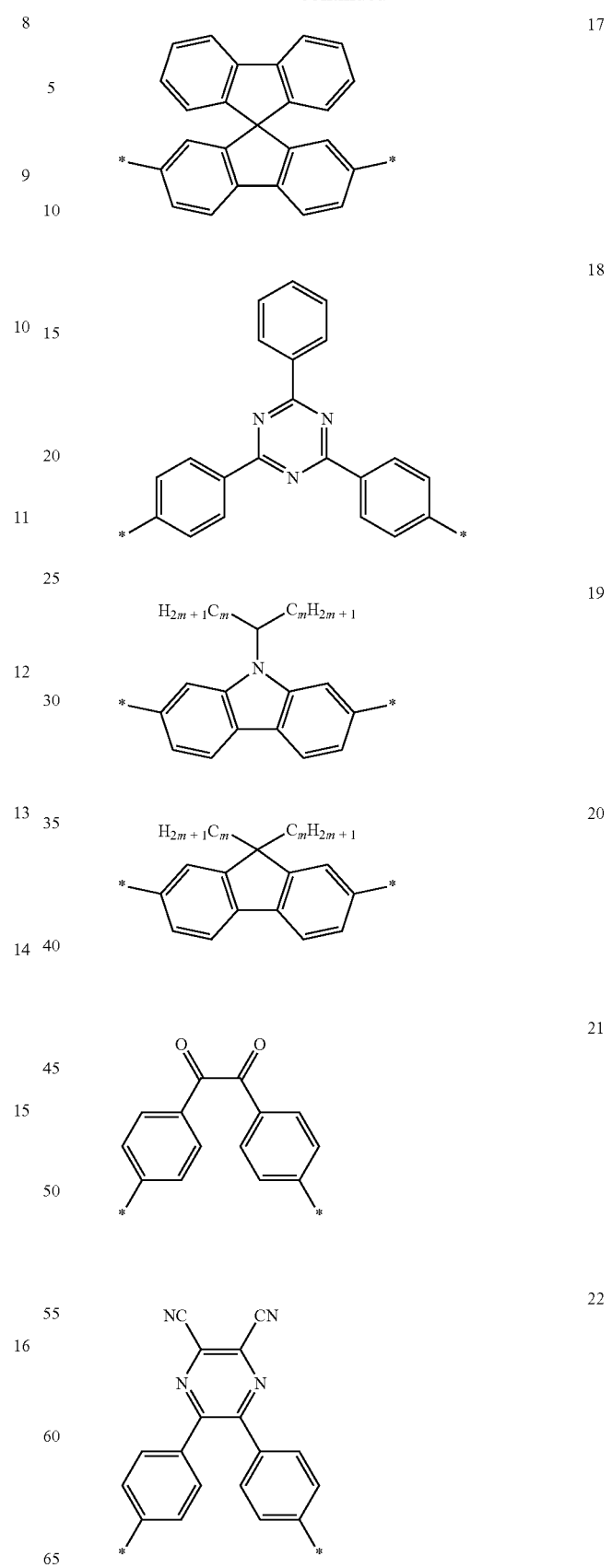

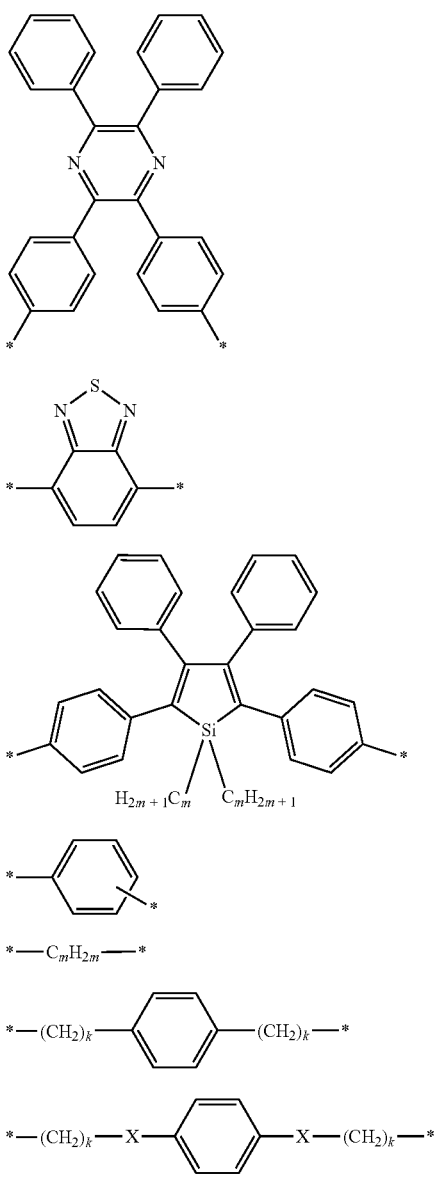

Wherein m, h and k are an integer of 1-20; X is selected from the group consisting of the elements of N, P, O, S and Si; and * indicates a substitution location.

The organic solvent in the step (1) is at least one of the group consisting of tetrahydrofuran, dichloromethane, chloroform, toluene, 1,4-dioxane, dimethyl sulfoxide, N,N-dimethylformamide, N,N-dimethylacetamide, acetonitrile, ethanol, N-methylpyrrolidone, dimethyl carbonate, diethyl carbonate, ethylene carbonate, and propylene carbonate. In view of the degree of influence of the solvent on the polymerization, it is further preferred that the organic solvent is selected from N,N-dimethylacetamide; in this case, the obtained narrow-range polyacetylene ester compound has good solubility as well as higher yield and molecular weight, which facilitates the next application.

The concentration of the reactive monomer may affect the yield of the reaction. Preferably, the concentration of the bifunctional alkyne monomer and the dihalide monomer in the organic solvent in the polymerization in the step (1) is 0.05-5 mol/L; further preferably, the concentration of the difunctional alkyne monomer in the organic solvent is 0.20 mol/L, and the molar ratio of the difunctional alkyne monomer to the dihalide monomer is 1:1.

The type and amount of the reaction catalyzer may affect the reaction time and the yield and molecular weight of the product. Preferably, the catalyzer in the step (1) is at least one of silver tungstate, silver iodide, silver nitrate, silver tetrafluoroborate, silver chloride, silver bromide, silver oxide, silver acetate, cuprous chloride, cuprous bromide, cuprous iodide, cuprous cyanide and cuprous oxide, and the catalyzer is used in an amount of 1-40 mol % of the bifunctional alkyne monomer; further preferably, the catalyzer is silver tungstate, and the catalyzer is used in an amount of 10 mol % of the difunctional alkyne monomer.

The type and amount of the reaction base may affect the reaction time and the yield and molecular weight of the product. Preferably, the base in the step (1) is at least one of cesium carbonate, potassium carbonate, potassium hydroxide, sodium hydroxide, cesium fluoride, potassium fluoride, potassium t-butoxide, sodium t-butoxide, lithium t-butoxide, 1,5,7-triazabicyclo[4.4.0]non-5-ene, and cesium acetate. The amount of the base is 100-1000 mol % of the bifunctional alkyne monomer; further preferably, the base is cesium carbonate, and the base is used in an amount of 300-600 mol % of the bifunctional alkyne monomer.

Preferably, the polymerization in the step (1) is performed at a temperature of 0° C. to 200° C. for 0.25-72 h. Further preferably, the polymerization is performed at a temperature of 80° C. for 12 h from the viewpoint of energy saving, high speed and high efficiency as well as the yield of the polymerization, and the molecular weight and the distribution thereof of the product obtained by polymerization.

The precipitant described in the step (2) is methanol or n-hexane.

A narrow-range polyacetylene ester compound having a structural formula as represented by formula (I):

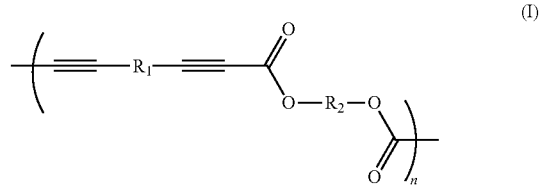

Wherein n is an integer of 0-200 excluding 0, and $R_1$ and $R_2$ are an organic group.

Preferably, $R_1$ is any one of the following organic groups of 1 to 26, and $R_2$ is any one of the following organic groups of 27 to 29.

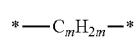

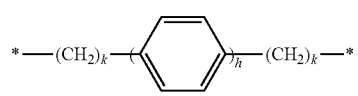

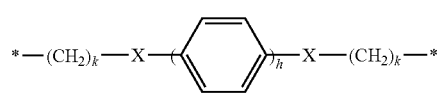

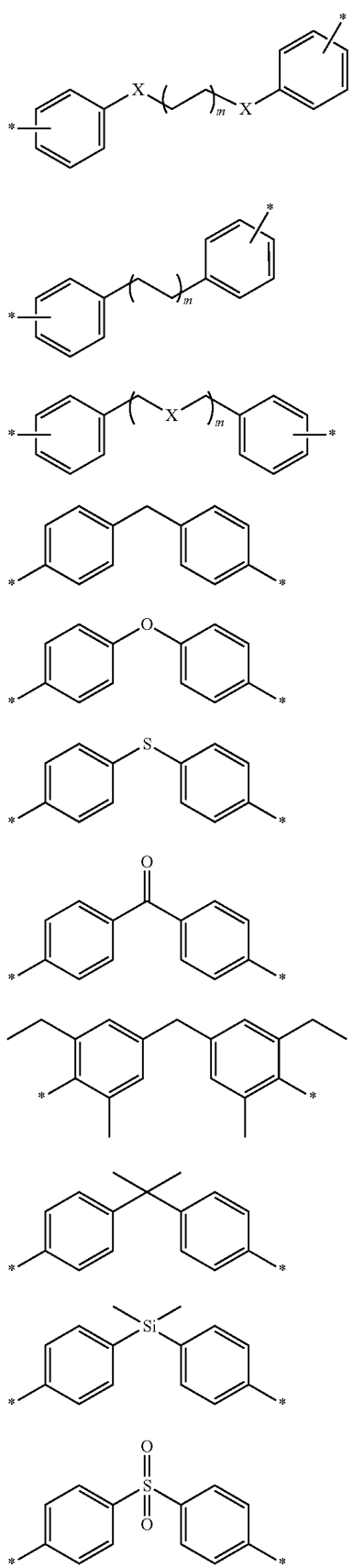
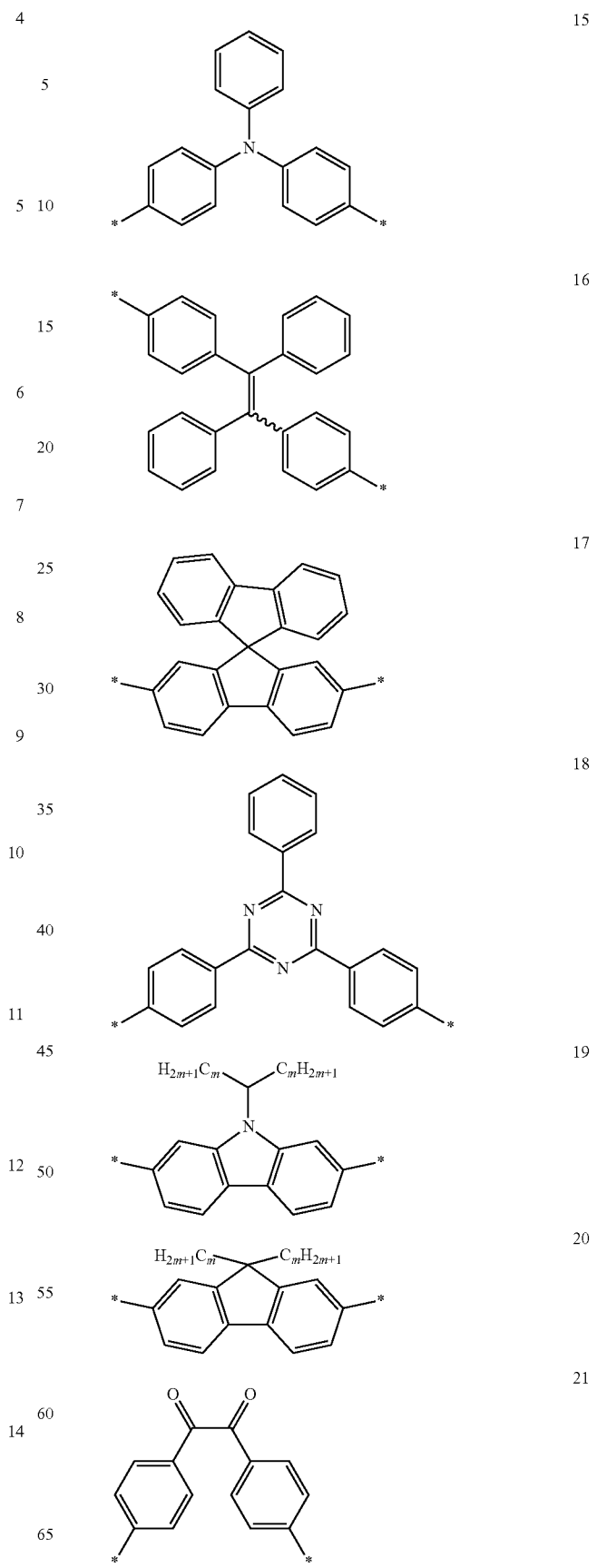

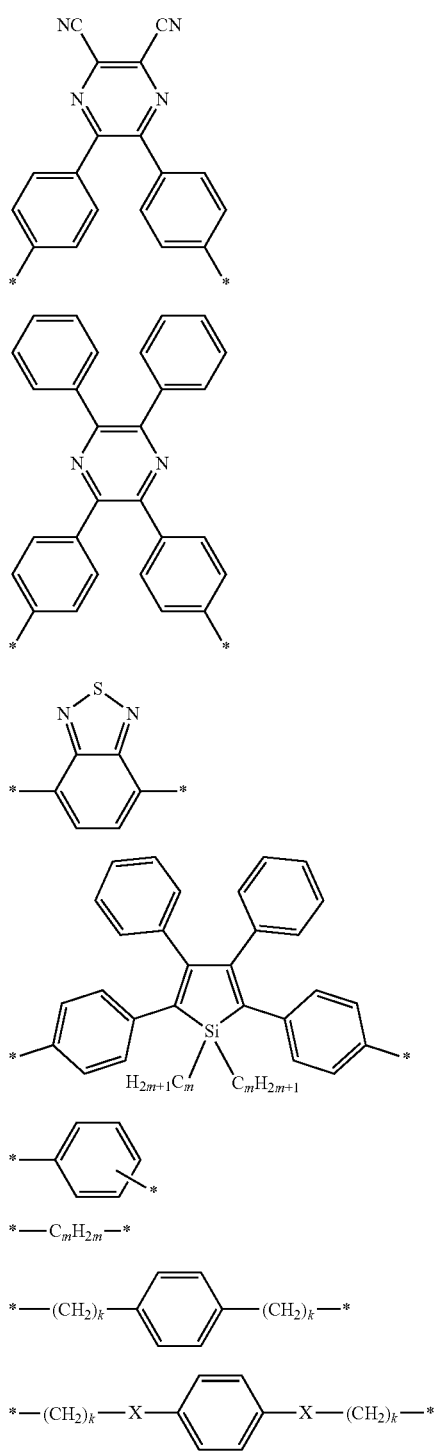

Wherein m, h and k are an integer of 1-20; X is selected from the group consisting of the elements of N, P, O, S and Si; and *indicates a substitution location.

The narrow-range polyacetylene ester compound is prepared by the above method, and has a molecular weight distribution coefficient (PDI) of 1.00 to 2.00.

The preparation method of the present invention and the obtained product have the following advantages and beneficial effects:

(1) The preparation method of the present invention can be carried out in atmospheric carbon dioxide atmosphere, and carbon dioxide is involved as a monomer in the formation of a polymer;

(2) the preparation method of the present invention is simple in operation, and the reaction raw materials and the catalyzer are easily available and can be directly purchased or prepared by a simple reaction; the polymerization has mild conditions and saves energy; one of the monomers in the polymerization is carbon dioxide, which is low in cost and environmentally friendly;

(3) the preparation method of the present invention has high tolerance to functional groups, and allows introduction of a plurality of functional groups; the obtained functionalized narrow-range polyacetylene ester compound has a narrow molecular weight distribution, good thermal stability, excellent processability and extraordinary degradation performance, and some polymers exhibit typical aggregation-induced emission properties due to the introduction of aggregation-induced emission groups.

DETAILED DESCRIPTION

The present invention will be further described in detail below with reference to examples and accompanying drawings, but the embodiments of the present invention are not limited thereto.

EXAMPLE 1

A narrow-range polyacetylene ester compound P1a/2a/$CO_2$ of this example has the following structural formula:

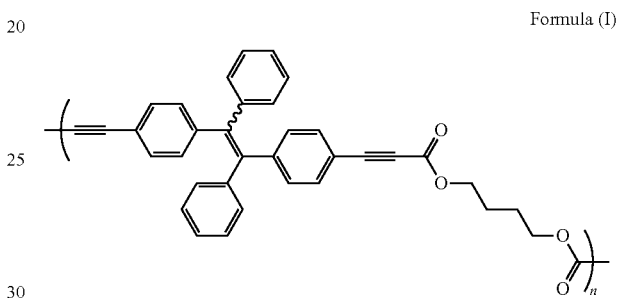

Formula (I)

The above narrow-range polyacetylene ester compound is prepared by polymerization of a bifunctional alkyne monomer, carbon dioxide and a dihalide monomer, with the reaction equation as follows:

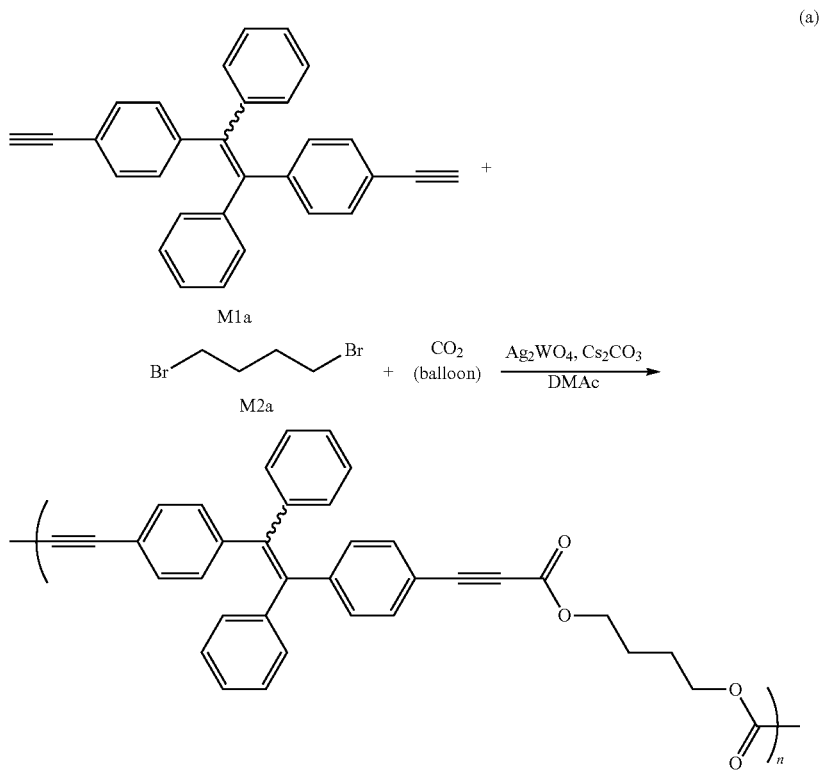

(a)

Wherein the monomer M1a can be synthesized according to the synthesis method disclosed in the applicant's literature (Chan, C. Y. K. et al. Construction of Functional Macromolecules with Well-Defined Structures by Indium-Catalyzed Three-Component Polycoupling of Alkynes, Aldehydes, and Amines. *Macromolecules* 46, 3246-3256 (2013)).

The specific preparation steps of the narrow-range polyacetylene ester compound described in this example are as follows:

To a dry Schlenk tube were added M1a (76.1 mg, 0.2 mmol), M2a (43.2 mg, 0.2 mmol), $Ag_2WO_4$ (9.3 mg, 0.02 mmol) and $Cs_2CO_3$ (390.0 mg, 1.2 mmol); the Schlenk tube was vacuumed for 0.5 h, and then pricked into a balloon filled with carbon dioxide; 1 mL of N,N-dimethylacetamide (DMAc) was added, a reaction went on at 80° C. for 12 h, and then the temperature was reduced to room temperature; the solution after the reaction was diluted with 4 mL of tetrahydrofuran, and then added dropwise to a conical flask containing 200 mL of methanol solution through a cotton filter device with strong stirring; the precipitate was allowed to stand for 12 h, and then filtered, rinsed with a methanol solution, and dried in a vacuum oven at 40° C. to a constant weight, thus resulting in a narrow-range polyacetylene ester compound P1a/2a/$CO_2$.

Characterization data of the narrow-range polyacetylene ester compound P1a/2a/$CO_2$: a yellow solid at a yield of 88%. The results of gel permeation chromatography (GPC) show a weight average molecular weight ($M_w$) of 13,600 and a molecular weight distribution (PDI) of 1.37.

Figure 1:
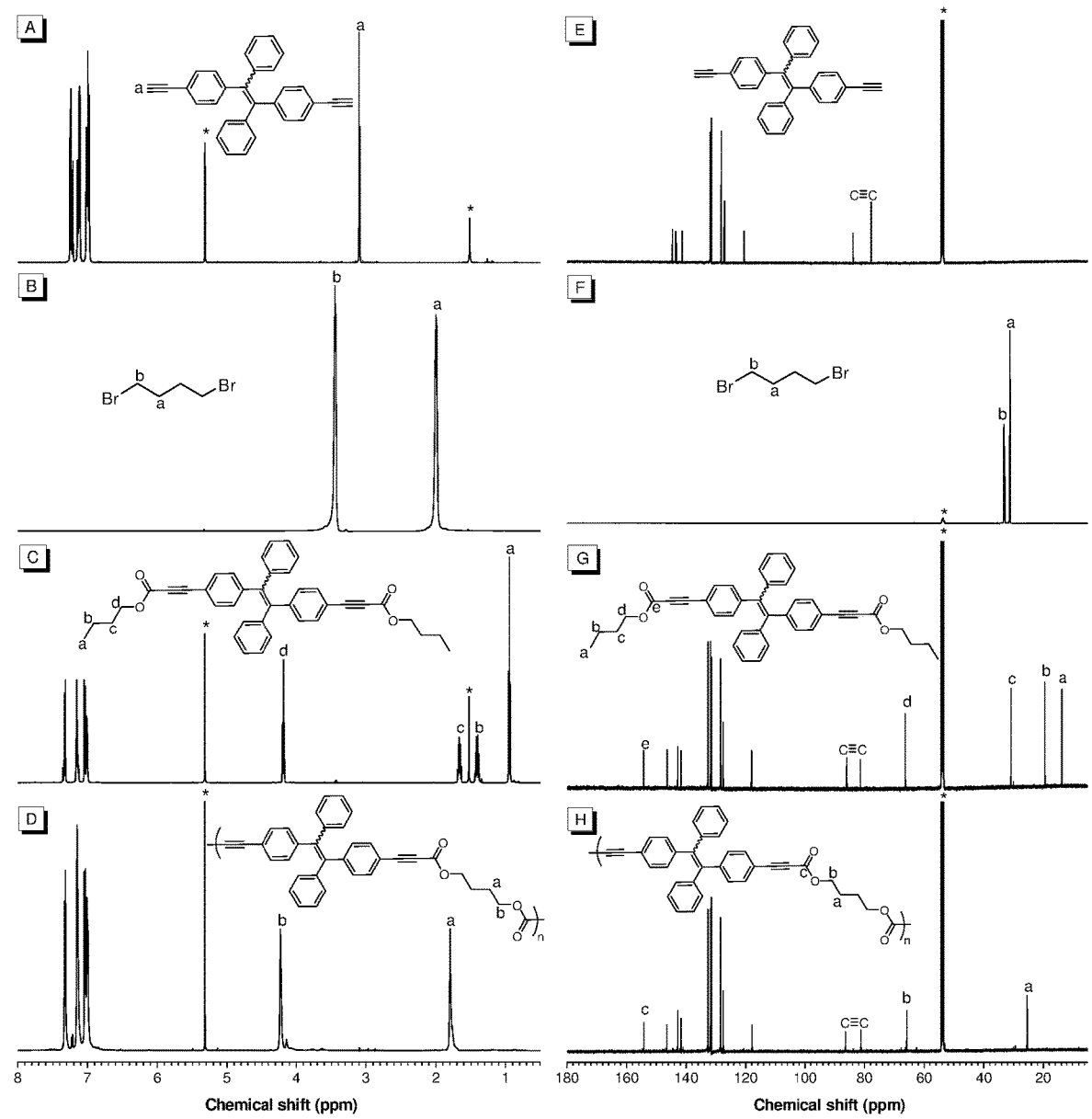
FIG. 1 shows a comparison of nuclear magnetic resonance hydrogen spectra of a narrow-range polyacetylene ester compound (D) prepared in Example 1 of the present invention with those of its monomers 1a(A), 2a(B) and a model compound (C) in $CD_2Cl_2$, and a comparison of nuclear magnetic resonance carbon spectra of a narrow-range polyacetylene ester compound (H) with those of its monomers 1a(E), 2a(F) and a model compound (G) in $CD_2Cl_2$ (*represents a solvent peak)

In order to characterize the structure of the narrow-range polyacetylene ester compound, a model reaction was performed and a model compound 3 obtained, with the reaction equation as follows:

It can be seen from the nuclear magnetic resonance spectra of FIG. 1 that the resonance absorption peak of the alkyne hydrogen in the monomer M1a (i.e., the monomer 1a) at a chemical shift of 3.09 has completely disappeared in the model compound 3 (the model compound) and the narrow-ranged polyacetylene ester compound (the polymer P1a/2a/$CO_2$); while in the hydrogen spectra of the model compound 3 (the model compound) and the narrow-range polyacetylene ester compound (the polymer P1a/2a/$CO_2$), a new resonance absorption peak representing a methylene hydrogen near the ester group appears at a chemical shift of 4.23.

It can be seen from the nuclear magnetic resonance carbon spectra of the model compound 3 (the model compound) and the narrow-range polyacetylene ester compound (the polymer P1a/2a/$CO_2$) in FIG. 1 that the resonance absorption peak representing an ester-based carbon appears at a chemical shift of 154.17 and the resonance absorption peak representing a methylene carbon near the ester group appears at a chemical shift of 65.77.

Figure 2:
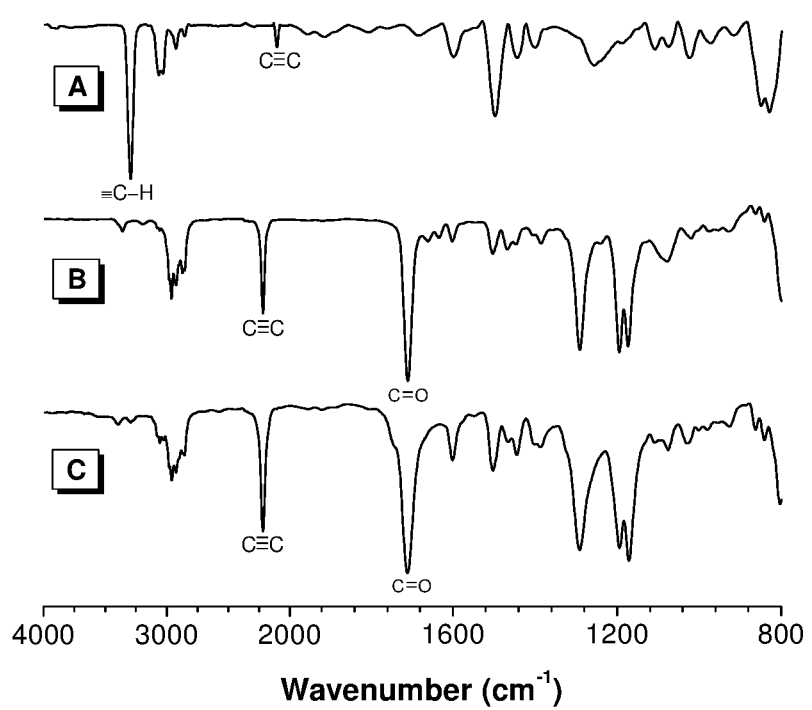
FIG. 2 shows a comparison of infrared absorption spectra of a narrow-range polyacetylene ester compound (C) prepared in Example 1 of the present invention with those of its monomer 1a(A) and a model compound (B)

It can be seen from FIG. 2 that the stretching vibration absorption peak at 3293 $cm^{-1}$ of ≡C—H in M1a (i.e., the monomer 1a) has completely disappeared in the infrared absorption spectra of the model compound 3 (the model compound) and the narrow-range polyacetylene ester compound (the polymer P1a/2a/$CO_2$); while in the infrared absorption spectra of the model compound 3 (the model compound) and the narrow-range polyacetylene ester compound (the polymer P1a/2a/$CO_2$), a new strong absorption peak representing the C═O stretching vibration appears at 1712 $cm^{-1}$.

The above data prove that we have obtained the target polymer. The narrow-range polyacetylene ester compound is

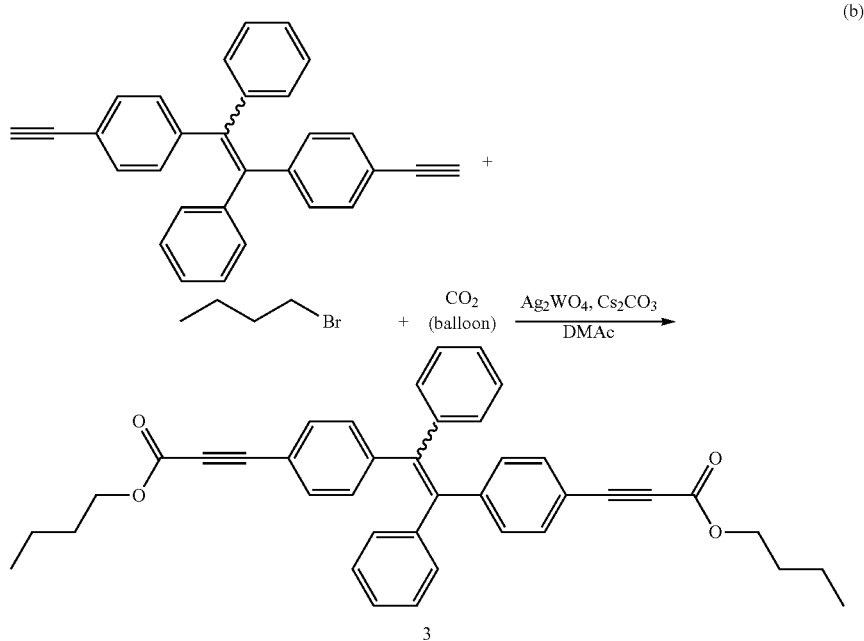

The comparison of the nuclear magnetic resonance spectra of the narrow-range polyacetylene ester compound obtained in this example with those of its corresponding monomer and the model compound (*represents the solvent peak) is shown in FIG. 1, and the infrared absorption spectra are shown in FIG. 2.

easily soluble in common organic solvents such as dichloromethane, chloroform, tetrahydrofuran, and N,N-dimethylformamide at room temperature, indicating excellent processability.

Figure 13:
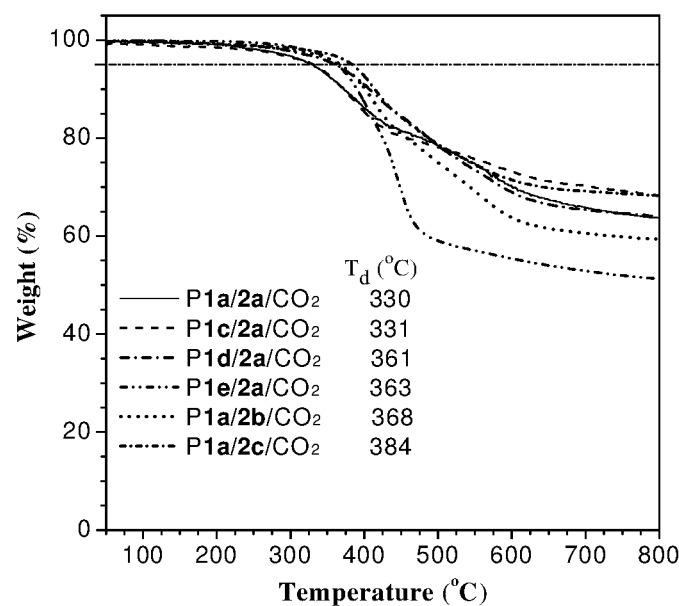
FIG. 13 shows thermal weight loss graphs of the narrow-range polyacetylene ester compounds prepared in Examples 1-6 of the present invention.
Figure 14:
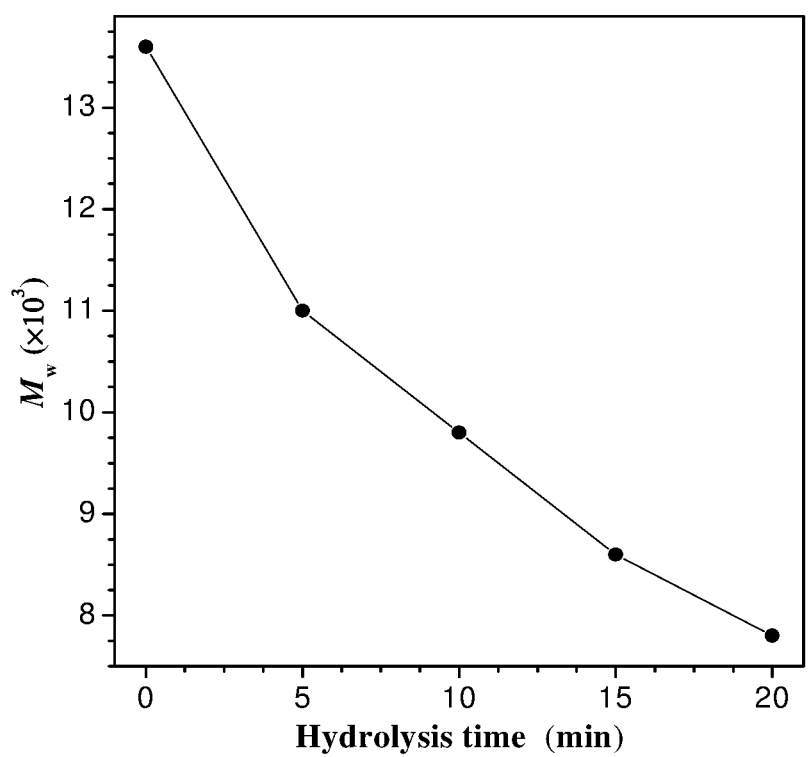
FIG. 14 is a graph showing changes in the weight average molecular weight of a narrow-range polyacetylene ester compound prepared in Example 1 of the present invention with the hydrolysis time in a mixed water and tetrahydrofuran solution of NaOH.

The thermal weight loss graph of the narrow-range polyacetylene ester compound prepared in Example 1 is shown in FIG. 13, wherein the test conditions were as follows: the test was performed in a nitrogen atmosphere, and the heating rate was 20° C./min; a graph showing changes in the weight average molecular weight of the narrow-range polyacetylene ester compound prepared in Example 1 with the hydrolysis time in a mixed water and tetrahydrofuran solution of NaOH is shown FIG. 14.

As can be seen from FIG. 13, the narrow-range polyacetylene ester compound has good thermal stability. The polymer exhibits typical aggregation-induced emission characteristic through testing of the solution and the absolute quantum yield in the solid state. As can be seen from FIG. 14, the narrow-range polyacetylene ester compound had a higher degradation rate in a mixed water and tetrahydrofuran solution of NaOH than a general linear polyester, having potential application value in the field of drug release and the like.

EXAMPLE 2

A narrow-range polyacetylene ester compound P1b/2b/$CO_2$ of this example has the following structural formula:

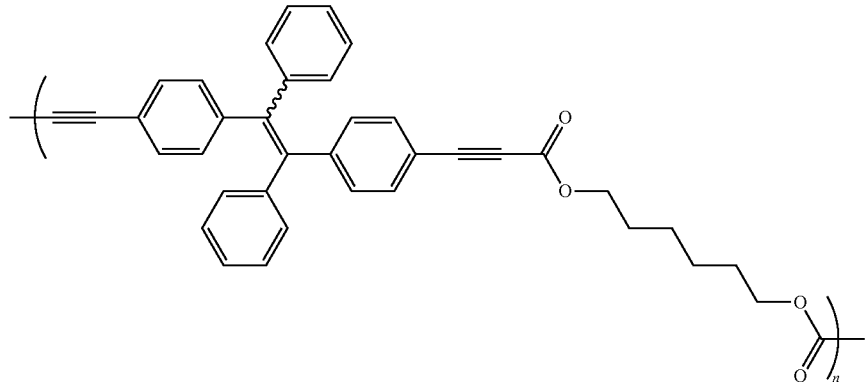

Formula (II)

The above narrow-range polyacetylene ester compound is prepared by polymerization of a bifunctional alkyne monomer, carbon dioxide and a dihalide monomer, with the reaction equation as follows:

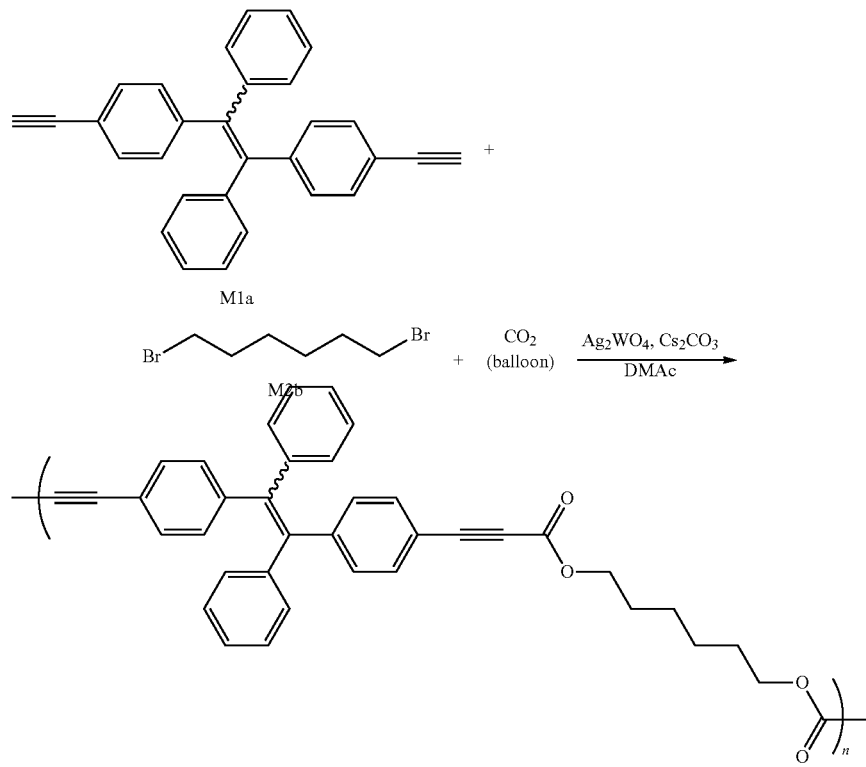

(c)

Wherein the monomer M1a can be synthesized according to the synthesis method disclosed in the applicant's literature (Chan, C. Y. K. et al. Construction of Functional Macromolecules with Well-Defined Structures by Indium-Catalyzed Three-Component Polycoupling of Alkynes, Aldehydes, and Amines. *Macromolecules* 46, 3246-3256 (2013)).

The specific preparation steps of the narrow-range polyacetylene ester compound described in this example are as follows:

To a dry Schlenk tube were added M1a (76.1 mg, 0.2 mmol), M2b (48.8 mg, 0.2 mmol), $Ag_2WO_4$ (9.3 mg, 0.02 mmol) and $Cs_2CO_3$ (390.0 mg, 1.2 mmol); the Schlenk tube was vacuumed for 0.5 h, and then pricked into a balloon filled with carbon dioxide; 1 mL of N,N-dimethylacetamide (DMAc) was added, a reaction went on at 80° C. for 12 h, and then the temperature was reduced to room temperature; the solution after the reaction was diluted with 4 mL of tetrahydrofuran, and then added dropwise to a conical flask containing 200 mL of methanol solution through a cotton filter device with strong stirring; the precipitate was allowed to stand for 12 h, and then filtered, rinsed with a methanol solution, and dried in a vacuum oven at 40° C. to a constant weight, thus resulting in a narrow-range polyacetylene ester compound P1a/2b/$CO_2$.

Characterization data of the narrow-range polyacetylene ester compound P1a/2b/$CO_2$: a yellow solid at a yield of 90%. The results of gel permeation chromatography (GPC) show a weight average molecular weight ($M_w$) of 20,500 and a molecular weight distribution (PDI) of 1.69.

In order to characterize the structure of the narrow-range polyacetylene ester compound, a model reaction was performed and a model compound 3 obtained, with the reaction equation as shown in (b) of Example 1.

Figure 3:
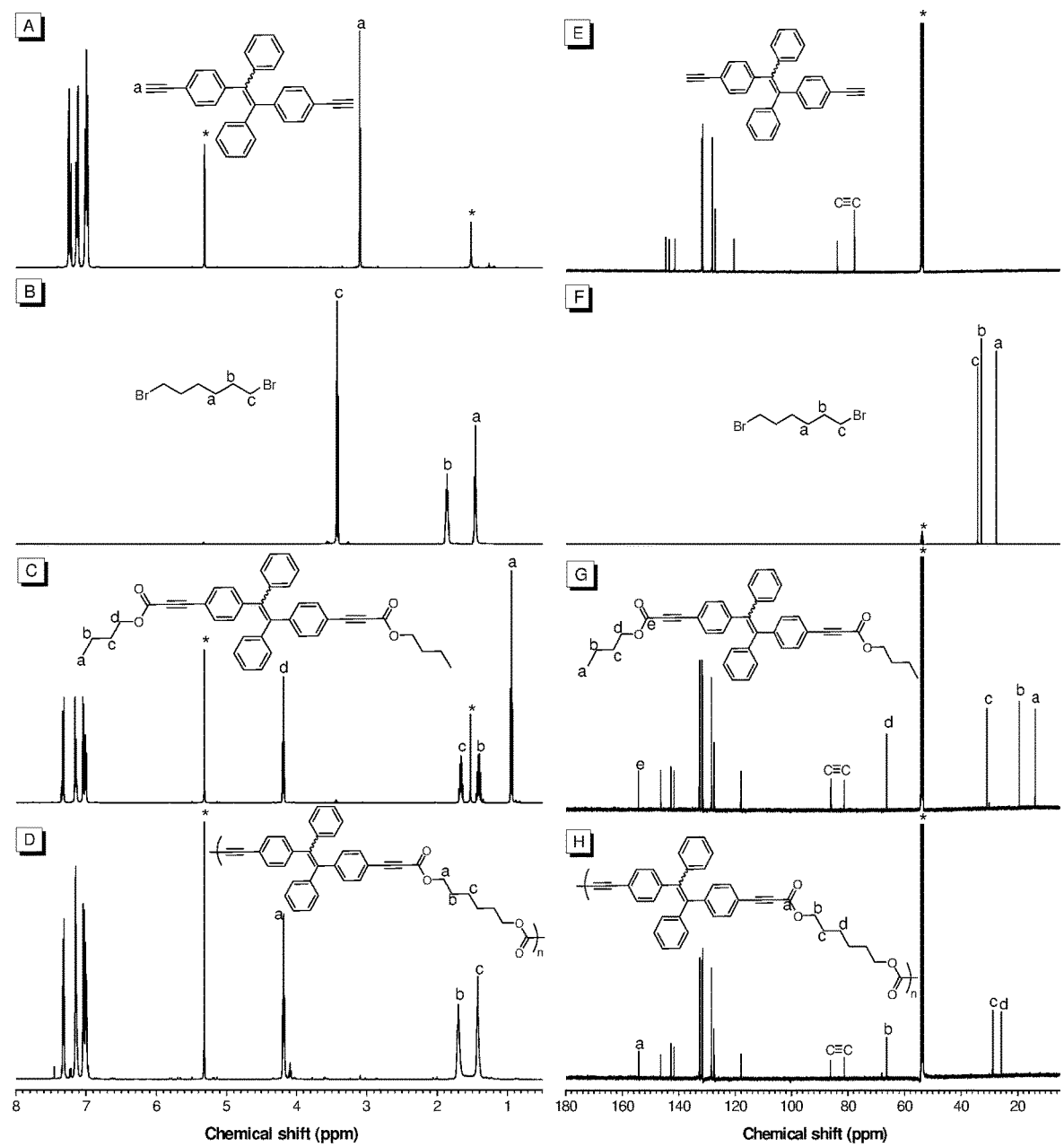
FIG. 3 shows a comparison of nuclear magnetic resonance hydrogen spectra of a narrow-range polyacetylene ester compound (D) prepared in Example 2 of the present invention with those of its monomers 1a(A), 2b(B) and a model compound (C) in $CD_2Cl_2$, and a comparison of nuclear magnetic resonance carbon spectra of a narrow-range polyacetylene ester compound (H) with those of its monomers 1a(E), 2b(F) and a model compound (G) in $CD_2Cl_2$ (*represents a solvent peak)
Figure 4:
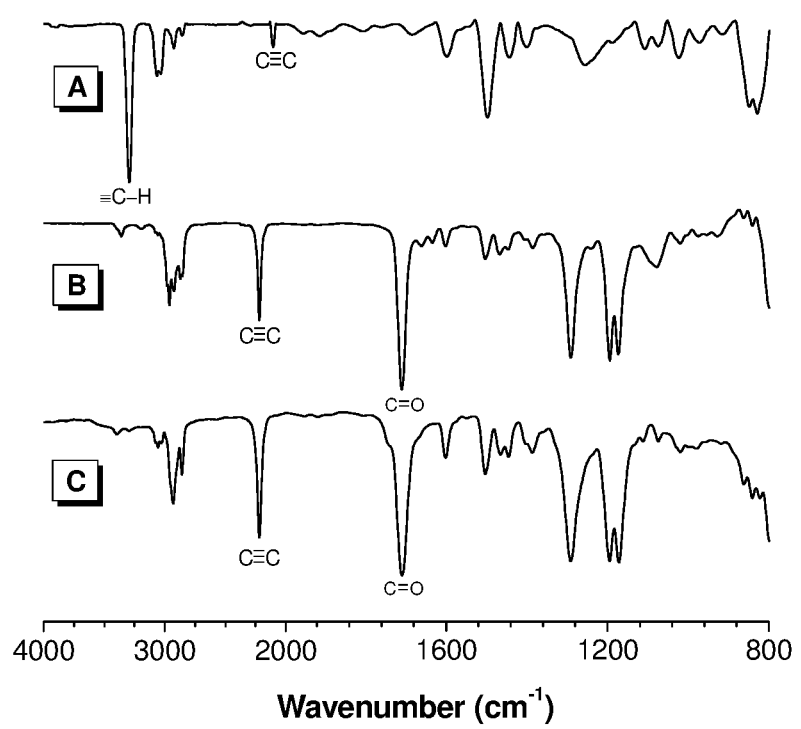
FIG. 4 shows a comparison of infrared absorption spectra of a narrow-range polyacetylene ester compound (C) prepared in Example 2 of the present invention with those of its monomer 1a(A) and a model compound (B)

The comparison of the nuclear magnetic resonance spectra of the narrow-range polyacetylene ester compound obtained in this example with those of its corresponding monomer and the model compound (*represents the solvent peak) is shown in FIG. 3, and the infrared absorption spectra are shown in FIG. 4.

It can be seen from the nuclear magnetic resonance hydrogen spectra of FIG. 3 that the resonance absorption peak of the alkyne hydrogen in the monomer M1a (i.e., the monomer 1a) at the chemical shift of 3.09 has completely disappeared in the model compound 3 (the model compound) and the narrow-ranged polyacetylene ester compound (the polymer P1a/2b/$CO_2$); while in the hydrogen spectra of the model compound 3 (the model compound) and the narrow-range polyacetylene ester compound (the polymer P1a/2b/$CO_2$), a resonance absorption peak representing a methylene hydrogen near the ester group appears at a chemical shift of 4.18.

It can be seen from the nuclear magnetic resonance carbon spectra of the model compound 3 (the model compound) and the narrow-range polyacetylene ester compound (the polymer P1a/2b/$CO_2$) in FIG. 3 that the resonance absorption peak representing an ester-based carbon appears at a chemical shift of 154.27 and the resonance absorption peak representing a methylene carbon near the ester group appears at a chemical shift of 66.35.

It can be seen from FIG. 4 that the stretching vibration absorption peak at 3293 $cm^{-1}$ of ≡C—H in M1a (i.e., the monomer 1a) has completely disappeared in the infrared absorption spectra of the model compound 3 (the model compound) and the narrow-range polyacetylene ester compound (the polymer P1a/2b/$CO_2$); while in the infrared absorption spectra of the model compound 3 (the model compound) and the narrow-range polyacetylene ester compound (the polymer P1a/2b/$CO_2$), a new strong absorption peak representing the C=O stretching vibration appears at 1709 $cm^{-1}$. The above data prove that we have obtained the target polymer. The narrow-range polyacetylene ester compound is easily soluble in common organic solvents such as dichloromethane, chloroform, tetrahydrofuran, and N,N-dimethylformamide at room temperature, indicating excellent processability.

The thermal weight loss graph of the narrow-range polyacetylene ester compound prepared in Example 2 is shown in FIG. 13.

As can be seen from FIG. 13, the narrow-range polyacetylene ester compound has good thermal stability. The polymer exhibits typical aggregation-induced emission through testing of the solution and the absolute quantum yield in the solid state.

EXAMPLE 3

A narrow-range polyacetylene ester compound P1a/2c/$CO_2$ of this example has the following structural formula:

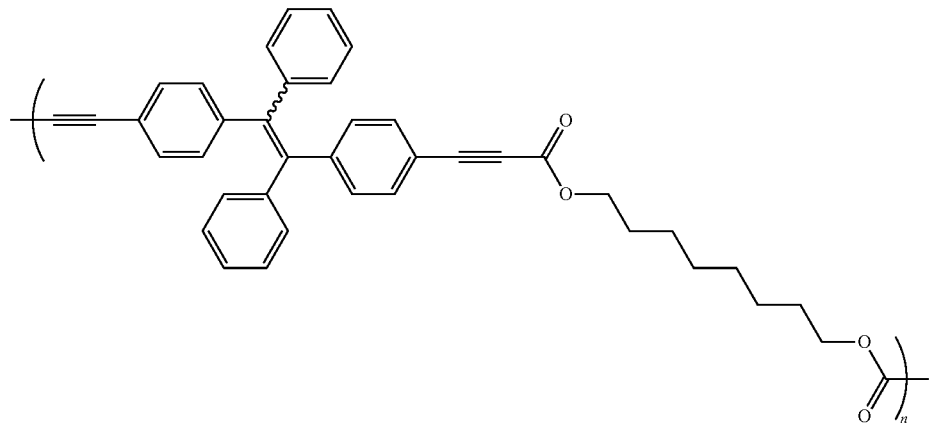

Formula (III)

The above narrow-range polyacetylene ester compound is prepared by polymerization of a bifunctional alkyne monomer, carbon dioxide and a dihalide monomer, with the reaction equation as follows:

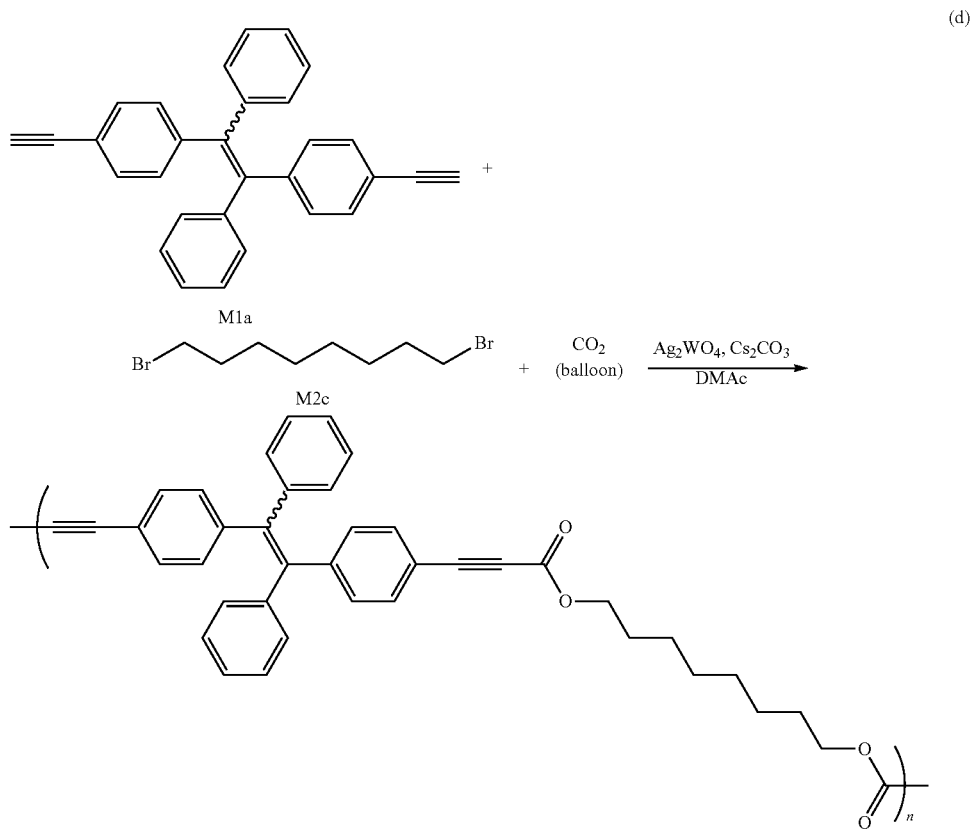

(d)

Wherein the monomer M1a can be synthesized according to the synthesis method disclosed in the applicant's literature (Chan, C. Y. K. et al. Construction of Functional Macromolecules with Well-Defined Structures by Indium-Catalyzed Three-Component Polycoupling of Alkynes, Aldehydes, and Amines. *Macromolecules* 46,3246-3256 (2013)).

The specific preparation steps of the narrow-range polyacetylene ester compound described in this example are as follows:

To a dry Schlenk tube were added M1a (76.1 mg, 0.2 mmol), M2c (54.4 mg, 0.2 mmol), $Ag_2WO_4$ (9.3 mg, 0.02 mmol) and $Cs_2CO_3$ (390.0 mg, 1.2 mmol); the Schlenk tube was vacuumed for 0.5 h, and then pricked into a balloon filled with carbon dioxide; 1 mL of N,N-dimethylacetamide (DMAc) was added, the reaction went on at 80° C. for 12 h, and then the temperature was reduced to room temperature; the solution after the reaction was diluted with 4 mL of tetrahydrofuran, and then added dropwise to a conical flask containing 200 mL of methanol solution through a cotton filter device with strong stirring; the precipitate was allowed to stand for 12 h, and then filtered, rinsed with a methanol solution, and dried in a vacuum oven at 40° C. to a constant weight, thus resulting in a narrow-range polyacetylene ester compound P1a/2c/$CO_2$.

Characterization data of the narrow-range polyacetylene ester compound P1a/2c/$CO_2$: a yellow solid at a yield of 95%. The results of gel permeation chromatography (GPC) show a weight average molecular weight ($M_w$) of 31,400 and a molecular weight distribution (PDI) of 1.86.

In order to characterize the structure of the narrow-range polyacetylene ester compound, a model reaction was performed and a model compound 3 (i.e., the model compound) obtained, with the reaction equation as shown in (b) of Example 1.

Figure 5:
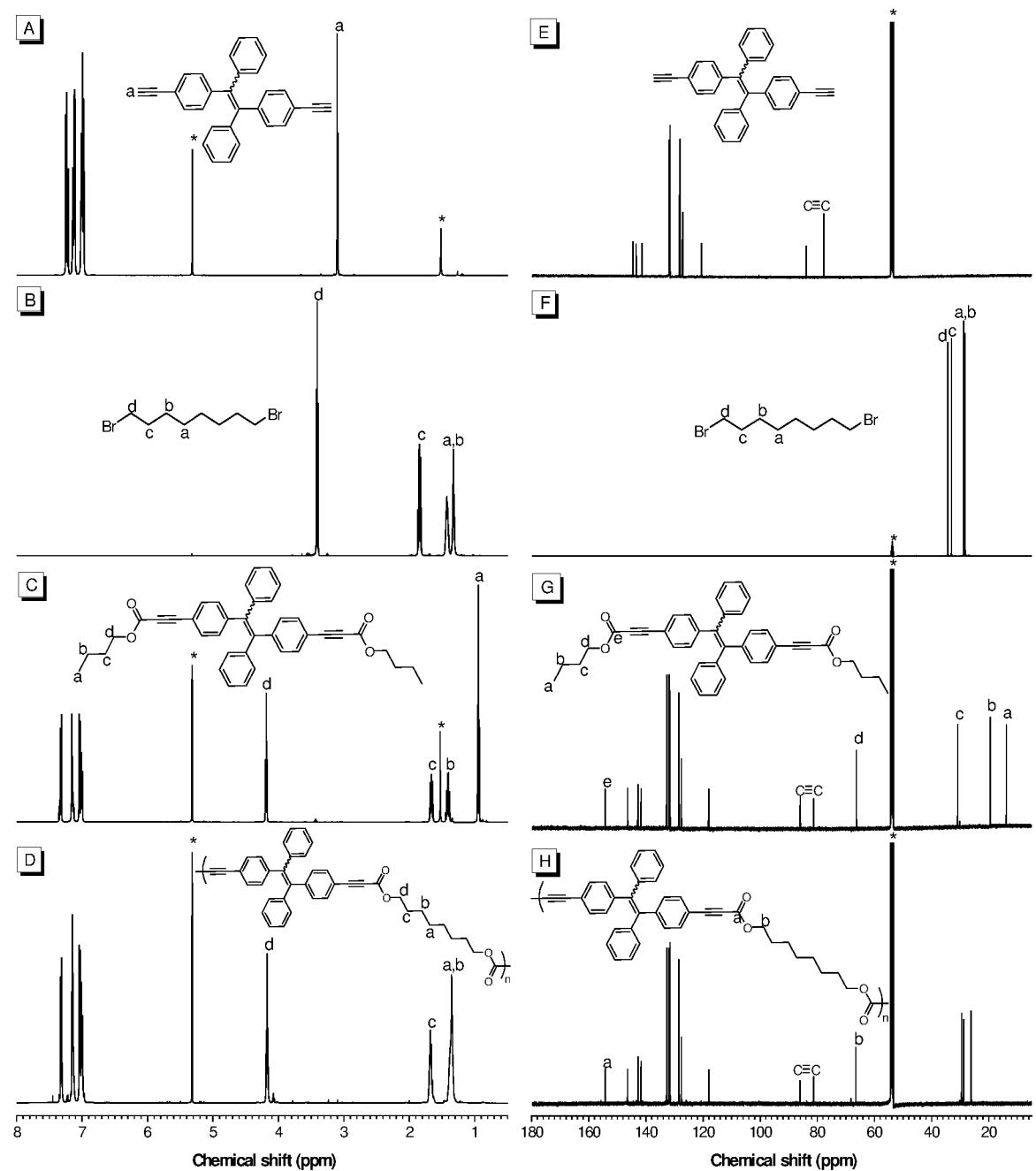
FIG. 5 shows a comparison of nuclear magnetic resonance hydrogen spectra of a narrow-range polyacetylene ester compound (D) prepared in Example 3 of the present invention with those of its monomers 1a(A), 2c(B) and a model compound (C) in $CD_2Cl_2$, and a comparison of nuclear magnetic resonance carbon spectra of a narrow-range polyacetylene ester compound (H) with those of its monomers 1a(E), 2c(F) and a model compound (G) in $CD_2Cl_2$ (*represents a solvent peak)
Figure 6:
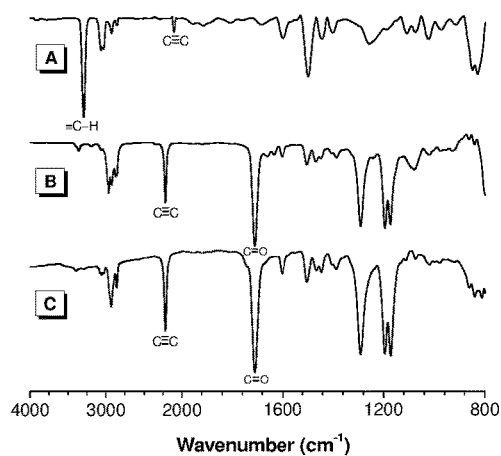
FIG. 6 shows a comparison of infrared absorption spectra of a narrow-range polyacetylene ester compound (C) prepared in Example 3 of the present invention with those of its monomer 1a(A) and a model compound (B)

The comparison of the nuclear magnetic resonance spectra of the narrow-range polyacetylene ester compound obtained in this example with those of its corresponding monomer and the model compound (*represents the solvent peak) is shown in FIG. 5, and the infrared absorption spectra are shown in FIG. 6.

It can be seen from the nuclear magnetic resonance hydrogen spectra of the model compound 3 (i.e., the model compound) and the narrow-range polyacetylene ester compound (P1a/2c/$CO_2$) in FIG. 5 that the resonance absorption peak of the alkyne hydrogen in the monomer M1a (i.e., the monomer 1a) at a chemical shift of 3.09 has completely disappeared in the model compound 3 (i.e., the model compound) and the narrow-range polyacetylene ester compound (P1a/2c/$CO_2$); while in the hydrogen spectra of the model compound 3 and the narrow-range polyacetylene ester compound (the polymer P1a/2c/$CO_2$), a resonance absorption peak representing a methylene hydrogen near the ester group appears at a chemical shift of 4.17.

It can be seen from the nuclear magnetic resonance carbon spectra of the model compound 3 (i.e., the model compound) and the narrow-range polyacetylene ester compound (the polymer P1a/2c/$CO_2$) in FIG. 5 that the resonance absorption peak representing an ester-based carbon appears at a chemical shift of 154.28 and the resonance absorption peak representing a methylene carbon near the ester group appears at a chemical shift of 66.53.

It can be seen from FIG. 6 that the stretching vibration absorption peak at 3293 $cm^{-1}$ of ≡C—H in M1a (i.e., the monomer 1a) has completely disappeared in the infrared absorption spectra of the model compound 3 and the narrow-range polyacetylene ester compound(P1a/2c/$CO_2$); while in the infrared absorption spectra of the model compound 3 and the narrow-range polyacetylene ester compound (P1a/2c/$CO_2$), a new strong absorption peak representing the C=O stretching vibration appears at 1709 $cm^{-1}$. The above data prove that we have obtained the target polymer. The narrow-range polyacetylene ester compound is easily soluble in common organic solvents such as dichloromethane, chloroform, tetrahydrofuran, and N,N-dimethylformamide at room temperature, indicating excellent processability.

The thermal weight loss graph of the narrow-range polyacetylene ester compound prepared in Example 3 is shown in FIG. 13. As can be seen from FIG. 13, the narrow-range polyacetylene ester compound has good thermal stability. The polymer exhibits typical aggregation-induced emission through testing of the solution and the absolute quantum yield in the solid state.

EXAMPLE 4

A narrow-range polyacetylene ester compound P1c/2a/$CO_2$ of this example has the following structural formula:

Formula (IV)

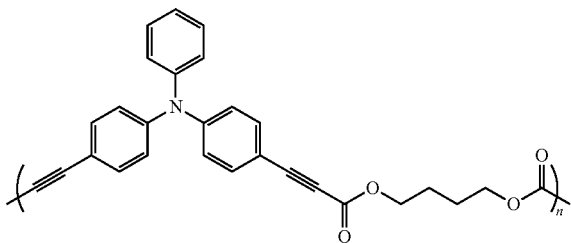

The above narrow-range polyacetylene ester compound is prepared by polymerization of a bifunctional alkyne monomer, carbon dioxide and a dihalide monomer, with the reaction equation as follows:

(e)

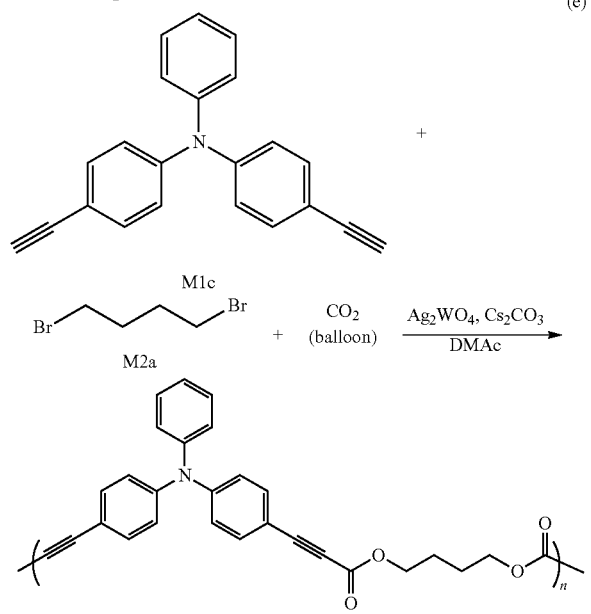

Wherein the monomer M1c can be synthesized according to the synthesis method disclosed in the applicant's literature (Chan, C. Y. K. et al. Construction of Functional Macromolecules with Well-Defined Structures by Indium-Catalyzed Three-Component Polycoupling of Alkynes, Aldehydes, and Amines. *Macromolecules* 46, 3246-3256 (2013)).

The specific preparation steps of the narrow-range polyacetylene ester compound described in this example are as follows:

To a dry Schlenk tube were added M1c (58.7 mg, 0.2 mmol), M2a (43.2 mg, 0.2 mmol), $Ag_2WO_4$ (9.3 mg, 0.02 mmol) and $Cs_2CO_3$ (390.0 mg, 1.2 mmol); the Schlenk tube was vacuumed for 0.5 h, and then pricked into a balloon filled with carbon dioxide; 1 mL of N,N-dimethylacetamide (DMAc) was added, the reaction went on at 80° C. for 12 h, and then the temperature was reduced to room temperature; the solution after the reaction was diluted with 4 mL of tetrahydrofuran, and then added dropwise to a conical flask containing 200 mL of methanol solution through a cotton filter device with strong stirring; the precipitate was allowed to stand for 12 h, and then filtered, rinsed with a methanol solution, and dried in a vacuum oven at 40° C. to a constant weight, thus resulting in a narrow-range polyacetylene ester compound P1c/2a/$CO_2$.

Characterization data of the narrow-range polyacetylene ester compound P1c/2a/$CO_2$: a yellow solid at a yield of 83%. The results of gel permeation chromatography (GPC) show a weight average molecular weight ($M_w$) of 12,100 and a molecular weight distribution (PDI) of 1.70.

Figure 7:
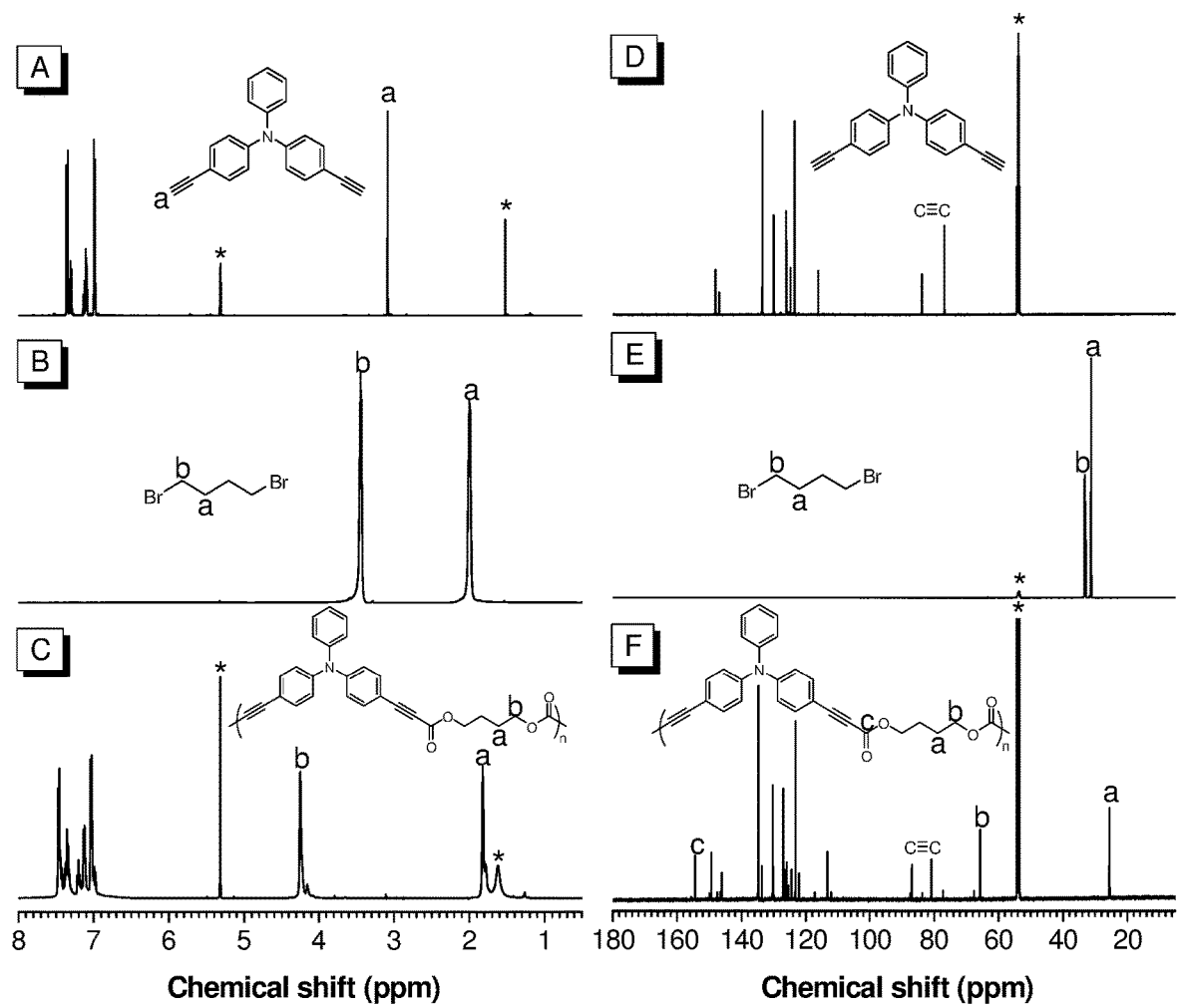
FIG. 7 shows a comparison of nuclear magnetic resonance hydrogen spectra of a narrow-range polyacetylene ester compound (C) prepared in Example 4 of the present invention with those of its monomers 1c(A) and 2a(B) in $CD_2Cl_2$, and a comparison of nuclear magnetic resonance carbon spectra of a narrow-range polyacetylene ester compound (F) with those of its monomers 1c(D) and 2a(E) in $CD_2Cl_2$ (*represents a solvent peak)
Figure 8:
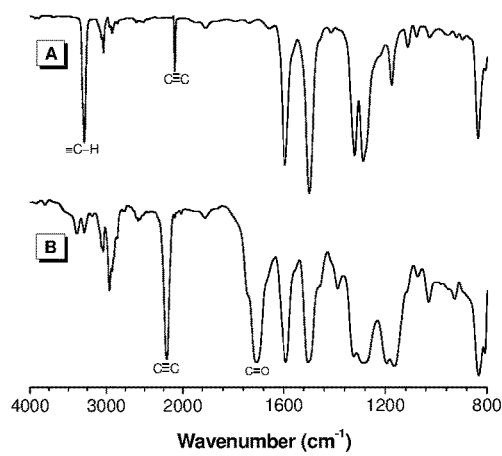
FIG. 8 shows a comparison of infrared absorption spectra of a narrow-range polyacetylene ester compound (B) prepared in Example 4 of the present invention with those of its monomer 1c(A)

The comparison of the nuclear magnetic resonance spectra of the narrow-range polyacetylene ester compound obtained in this example with those of its corresponding monomer (*represents the solvent peak) is shown in FIG. 7, and the infrared absorption spectra are shown in FIG. 8.

It can be seen from the nuclear magnetic resonance hydrogen spectra in FIG. 7 that the resonance absorption peak of the alkyne hydrogen in the monomer M1c (i.e., the monomer 1c) at a chemical shift of 3.09 has completely disappeared in the narrow-range polyacetylene ester compound (P1c/2a/$CO_2$); while in the hydrogen spectra of the narrow-range polyacetylene ester compound (the polymer P1c/2a/$CO_2$), a resonance absorption peak representing a methylene hydrogen near the ester group appears at a chemical shift of 4.25. It can be seen from the nuclear magnetic resonance carbon spectra of the narrow-range polyacetylene ester compound (the polymer P1c/2a/$CO_2$) in FIG. 7 that the resonance absorption peak representing an ester-based carbon appears at a chemical shift of 154.38 and the resonance absorption peak representing a methylene carbon near the ester group appears at a chemical shift of 65.71.

It can be seen from FIG. 8 that the stretching vibration absorption peak at 3290 $cm^{-1}$ of ≡C—in M1c (i.e., the monomer 1c) has completely disappeared in the infrared absorption spectra of the narrow-range polyacetylene ester compound (P1c/2a/$CO_2$); while in the infrared absorption spectra of the narrow-range polyacetylene ester compound (P1c/2a/$CO_2$), a strong absorption peak representing the C=O stretching vibration appears at 1708 $cm^{-1}$. The above data prove that we have obtained the target polymer. The narrow-range polyacetylene ester compound is easily soluble in common organic solvents such as dichloromethane, chloroform, tetrahydrofuran, and N,N-dimethylformamide at room temperature, indicating excellent process ability.

The thermal weight loss graph of the narrow-range polyacetylene ester compound prepared in Example 4 is shown in FIG. 13. As can be seen from FIG. 13, the narrow-range polyacetylene ester compound has good thermal stability.

EXAMPLE 5

A narrow-range polyacetylene ester compound P1d/2a/$CO_2$ of this example has the following structural formula:

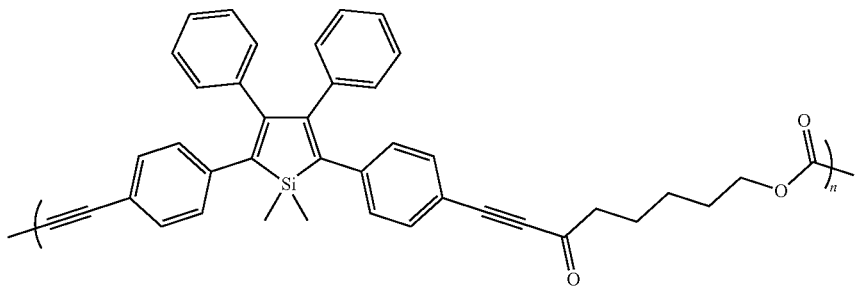

Formula (V)

The above narrow-range polyacetylene ester compound is prepared by polymerization of a bifunctional alkyne monomer, carbon dioxide and a dihalide monomer, with the reaction equation as follows:

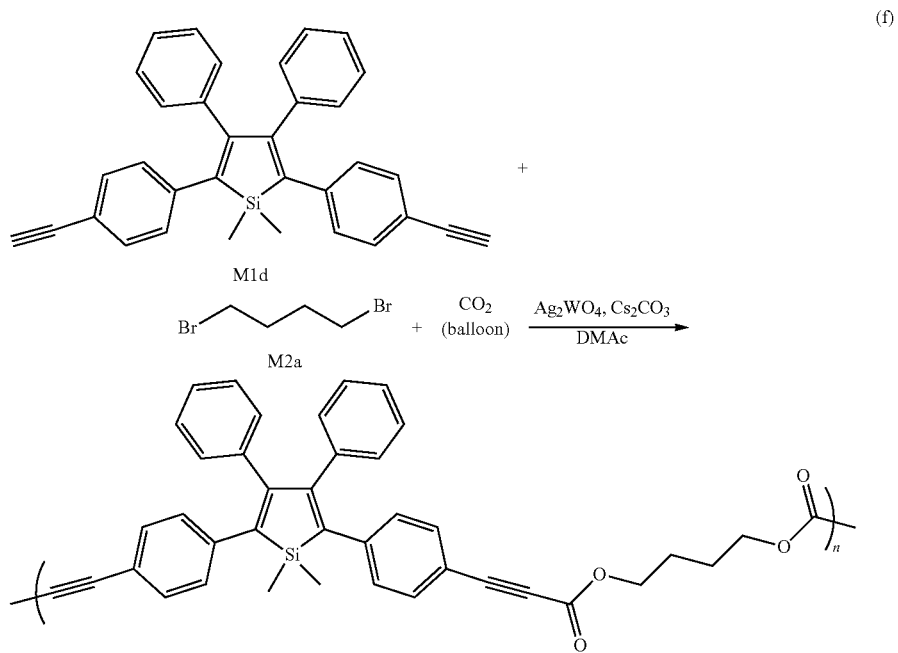

(f)

Wherein the monomer M1d can be synthesized according to the synthesis method disclosed in the applicant's literature (Chan, C. Y. K. et al. Construction of Functional Macromolecules with Well-Defined Structures by Indium-Catalyzed Three-Component Polycoupling of Alkynes, Aldehydes, and Amines. *Macromolecules* 46, 3246-3256 (2013)).

The specific preparation steps of the narrow-range polyacetylene ester compound described in this example are as follows:

To a dry Schlenk tube were added M1d (92.5 mg, 0.2 mmol), M2a (43.2 mg, 0.2 mmol), $Ag_2WO_4$ (9.3 mg, 0.02 mmol) and $C_2CO_3$ (390.0 mg, 1.2 mmol); the Schlenk tube was vacuumed for 0.5 h, and then pricked into a balloon filled with carbon dioxide; 1 mL of N,N-dimethylacetamide (DMAc) was added, the reaction went on at 80° C. for 12 h, and then the temperature was reduced to room temperature; the solution after the reaction was diluted with 4 mL of tetrahydrofuran, and then added dropwise to a conical flask containing 200 mL of methanol solution through a cotton filter device with strong stirring; the precipitate was allowed to stand for 12 h, and then filtered, rinsed with a methanol solution, and dried in a vacuum oven at 40° C. to a constant weight, thus resulting in a narrow-range polyacetylene ester compound P1d/2a/$CO_2$.

Characterization data of the narrow-range polyacetylene ester compound P1d/2a/$CO_2$: a yellow solid at a yield of 85%. The results of gel permeation chromatography (GPC) show a weight average molecular weight ($M_w$) of 13,200 and a molecular weight distribution (PDI) of 1.61.

Figure 9:
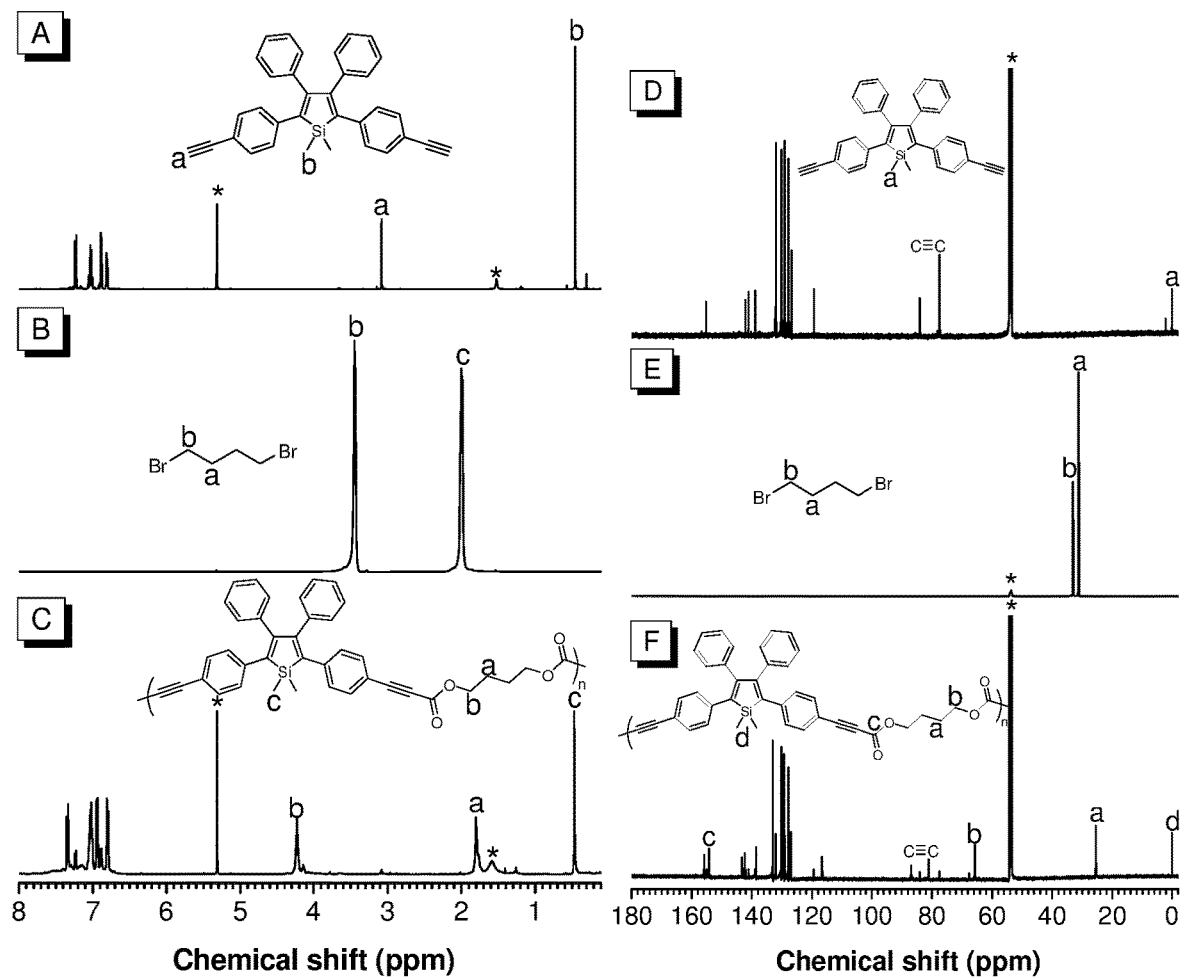
FIG. 9 shows a comparison of nuclear magnetic resonance hydrogen spectra of a narrow-range polyacetylene ester compound (C) prepared in Example 5 of the present invention with those of its monomers 1d(A) and 2a(B) in $CD_2Cl_2$, and a comparison of nuclear magnetic resonance carbon spectra of a narrow-range polyacetylene ester compound (F) with those of its monomers 1d(D) and 2a(E) in $CD_2Cl_2$ (*represents a solvent peak)
Figure 10:
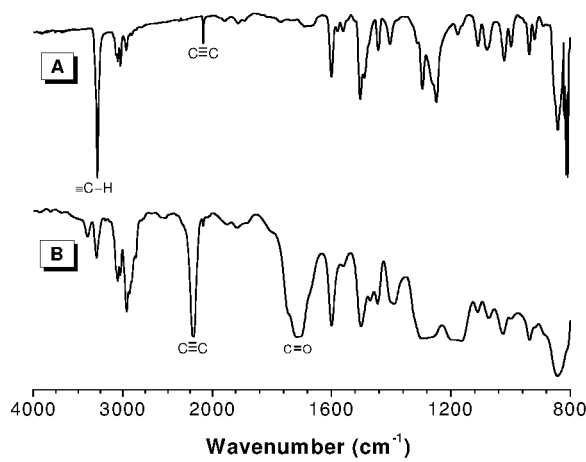
FIG. 10 shows a comparison of infrared absorption spectra of a narrow-range polyacetylene ester compound (B) prepared in Example 5 of the present invention with those of its monomer 1d(A)

The comparison of the nuclear magnetic resonance spectra of the narrow-range polyacetylene ester compound obtained in this example with those of its corresponding monomer (*represents the solvent peak) is shown in FIG. 9, and the infrared absorption spectra are shown in FIG. 10.

It can be seen from the nuclear magnetic resonance hydrogen spectra in FIG. 9 that the resonance absorption peak of the alkyne hydrogen in the monomer M1d (i.e., the monomer 1d) at a chemical shift of 3.08 has completely disappeared in the narrow-range polyacetylene ester compound (P1d/2a/CO$_2$); while in the hydrogen spectra of the narrow-range polyacetylene ester compound (the polymer P1d/2a/CO$_2$), a resonance absorption peak representing a methylene hydrogen near the ester group appears at a chemical shift of 4.23.

It can be seen from the nuclear magnetic resonance carbon spectra of the narrow-range polyacetylene ester compound (the polymer P1d/2a/CO$_2$) in FIG. 9 that the resonance absorption peak representing an ester-based carbon appears at a chemical shift of 154.28 and the resonance absorption peak representing a methylene carbon near the ester group appears at a chemical shift of 65.73.

It can be seen from FIG. 10 that the stretching vibration absorption peak at 3287 cm$^{-1}$ of ≡C—in M1d (i.e., the monomer 1d) has completely disappeared in the infrared absorption spectra of the narrow-range polyacetylene ester compound (P1d/2a/CO$_2$); while in the infrared absorption spectra of the narrow-range polyacetylene ester compound (P1d/2a/CO$_2$), a strong absorption peak representing the C=O stretching vibration appears at 1708 cm$^{-1}$. The above data prove that we have obtained the target polymer. The narrow-range polyacetylene ester compound is easily soluble in common organic solvents such as dichloromethane, chloroform, tetrahydrofuran, and N,N-dimethylformamide at room temperature, indicating excellent process ability.

The thermal weight loss graph of the narrow-range polyacetylene ester compound prepared in Example 5 is shown in FIG. 13. As can be seen from FIG. 13, the narrow-range polyacetylene ester compound has good thermal stability. The polymer exhibits typical aggregation-induced emission through testing of the solution and the absolute quantum yield in the solid state.

EXAMPLE 6

A narrow-range polyacetylene ester compound P1e/2a/CO$_2$ of this example has the following structural formula:

Formula (VI)

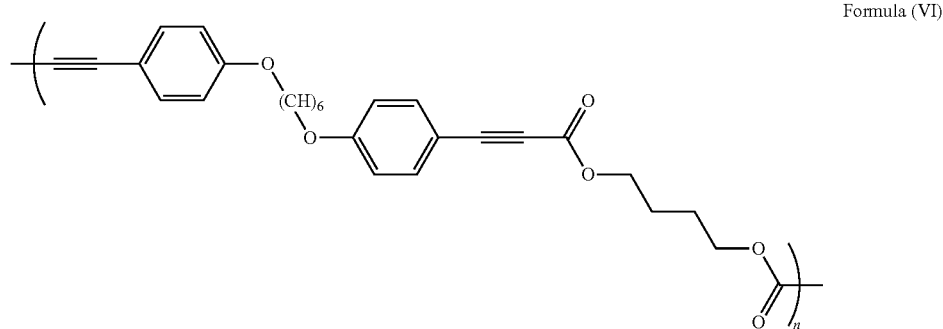

The above narrow-range polyacetylene ester compound is prepared by polymerization of a bifunctional alkyne monomer, carbon dioxide and a dihalide monomer, with the reaction equation as follows:

(g)

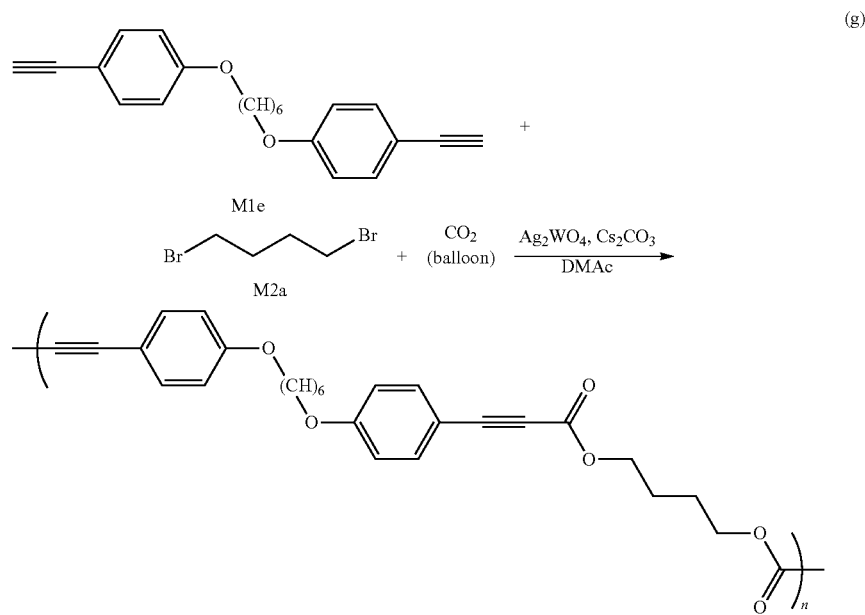

Wherein the monomer M1e can be synthesized according to the synthesis method disclosed in the applicant's literature (Li, W. et al. Catalyzer-Free, Atom-Economic, Multicomponent Polymerizations of Aromatic Diynes, Elemental Sulfur, and Aliphatic Diamines toward Luminescent Polythioamides. *Macromolecules* 48, 7747-7754 (2015)).

The specific preparation steps of the narrow-range polyacetylene ester compound described in this example are as follows:

To a dry Schlenk tube were added M1e (63.7 mg, 0.2 mmol), M2a (43.2 mg, 0.2 mmol), $Ag_2WO_4$ (9.3 mg, 0.02 mmol) and $Cs_2CO_3$ (390.0 mg, 1.2 mmol); the Schlenk tube was vacuumed for 0.5 h, and then pricked into a balloon filled with carbon dioxide; 1 mL of N,N-dimethylacetamide (DMAc) was added, the reaction went on at 80° C. for 12 h, and then the temperature was reduced to room temperature; the solution after the reaction was diluted with 4 mL of tetrahydrofuran, and then added dropwise to a conical flask containing 200 mL of methanol solution through a cotton filter device with strong stirring; the precipitate was allowed to stand for 12 h, and then filtered, rinsed with a methanol solution, and dried in a vacuum oven at 40° C. to a constant weight, thus resulting in a narrow-range polyacetylene ester compound P1e/2a/$CO_2$.

Characterization data of the narrow-range polyacetylene ester compound P1e/2a/$CO_2$: a light gray solid at a yield of 78%. The results of gel permeation chromatography (GPC) show a weight average molecular weight ($M_w$) of 20,600 and a molecular weight distribution (PDI) of 2.00.

Figure 11:
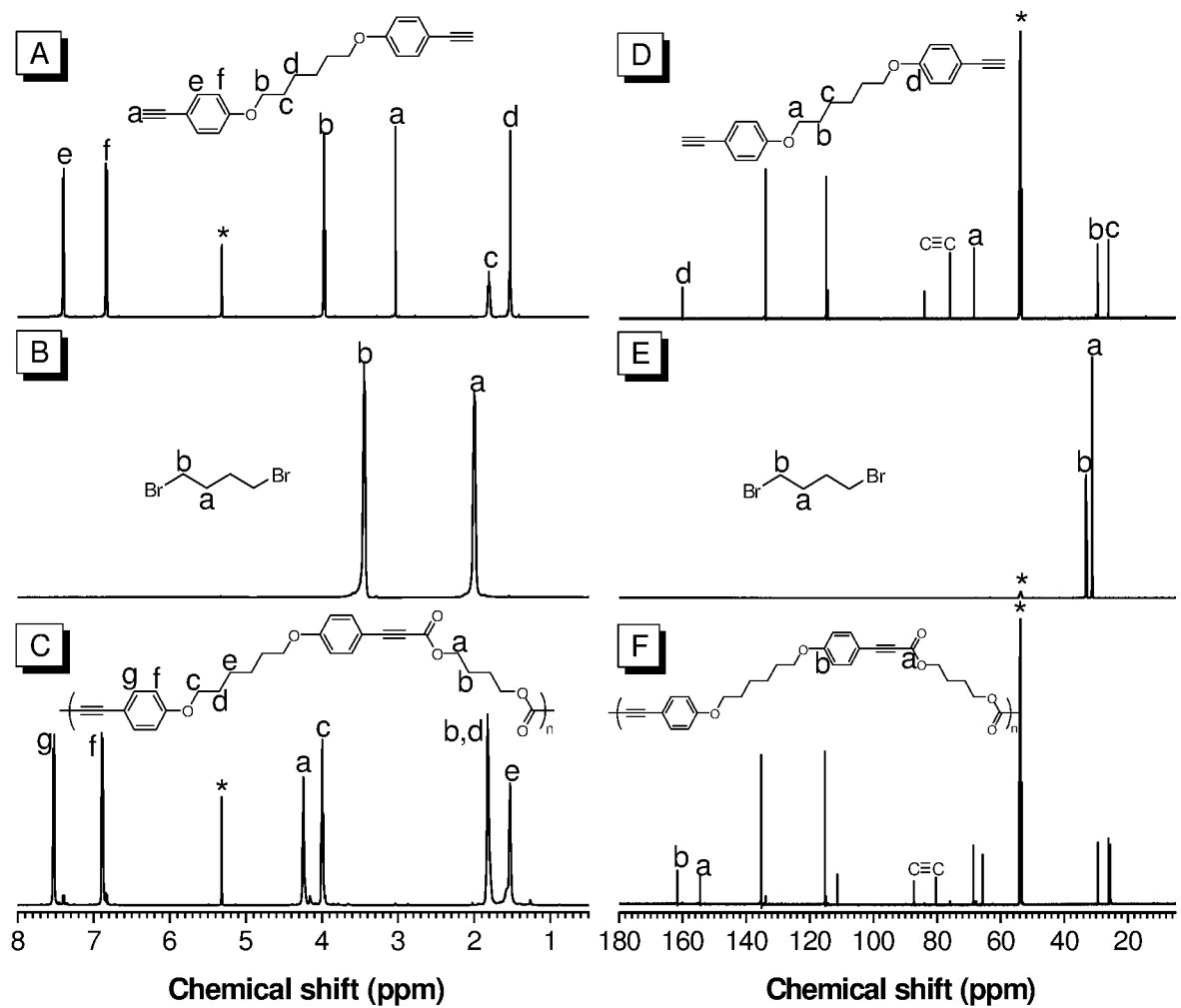
FIG. 11 shows a comparison of nuclear magnetic resonance hydrogen spectra of a narrow-range polyacetylene ester compound (C) prepared in Example 6 of the present invention with those of its monomers 1e(A) and 2a(B) in $CD_2Cl_2$, and a comparison of nuclear magnetic resonance carbon spectra of a narrow-range polyacetylene ester compound (F) with those of its monomers 1e(D) and 2a(E) in $CD_2Cl_2$ (*represents a solvent peak)
Figure 12:
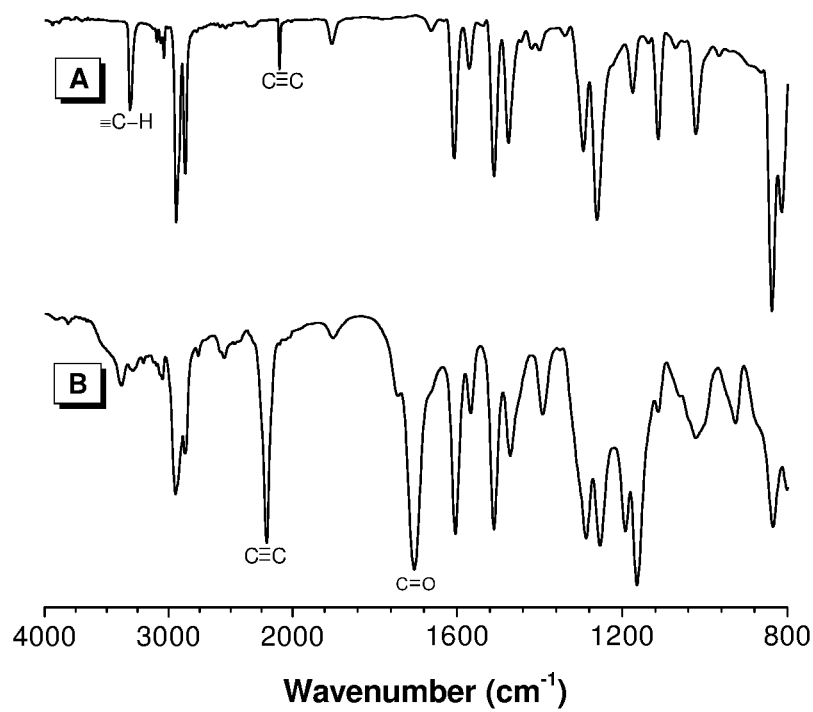
FIG. 12 shows a comparison of infrared absorption spectra of a narrow-range polyacetylene ester compound (B) prepared in Example 6 of the present invention with those of its monomer 1e(A)

The comparison of the nuclear magnetic resonance spectra of the narrow-range polyacetylene ester compound obtained in this example with those of its corresponding monomer (*represents the solvent peak) is shown in FIG. 11, and the infrared absorption spectra are shown in FIG. 12.

It can be seen from the nuclear magnetic resonance hydrogen spectra in FIG. 11 that the resonance absorption peak of the alkyne hydrogen in the monomer M1e (i.e., the monomer 1e) at a chemical shift of 3.03 has completely disappeared in the narrow-range polyacetylene ester compound (P1e/2a/$CO_2$); while in the hydrogen spectra of the narrow-range polyacetylene ester compound (the polymer P1e/2a/$CO_2$), a resonance absorption peak representing a methylene hydrogen near the ester group appears at a chemical shift of 4.24. It can be seen from the nuclear magnetic resonance carbon spectra of the narrow-range polyacetylene ester compound (the polymer P1e/2a/$CO_2$) in FIG. 11 that the resonance absorption peak representing an ester-based carbon appears at a chemical shift of 154.48 and the resonance absorption peak representing a methylene carbon near the ester group appears at a chemical shift of 65.64.

It can be seen from FIG. 12 that the stretching vibration absorption peak at 3310 $cm^{-1}$ of ≡C— in M1e (i.e., the monomer 1e) has completely disappeared in the infrared absorption spectra of the narrow-range polyacetylene ester compound (P1e/2a/$CO_2$); while in the infrared absorption spectra of the narrow-range polyacetylene ester compound (P1e/2a/$CO_2$), a strong absorption peak representing the C=O stretching vibration appears at 1703 $cm^{-1}$. The above data prove that we have obtained the target polymer. The narrow-range polyacetylene ester compound is easily soluble in common organic solvents such as dichloromethane, chloroform, tetrahydrofuran, and N,N-dimethylformamide at room temperature, indicating excellent process ability.

The thermal weight loss graph of the narrow-range polyacetylene ester compound prepared in Example 6 is shown in FIG. 13. As can be seen from FIG. 13, the narrow-range polyacetylene ester compound has good thermal stability.

The above examples are preferred embodiments of the present invention, but the embodiments of the present invention are not limited thereto, and any other alterations, modifications, substitutions, combinations and simplifications made without departing from the spirit and principle of the present invention should all be equivalent replacements and included in the scope of protection of the present invention.

The invention claimed is:

1. A narrow-range polyacetylene ester compound comprising a structural formula as represented by a formula (I):

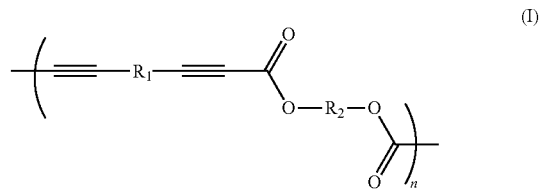

wherein n is an integer of 0-200 excluding 0, and $R_1$ and $R_2$ are an organic group;

wherein $R_1$ is any one of the following organic groups of 1 to 26, and $R_2$ is any one of the following organic groups of 27 to 29:

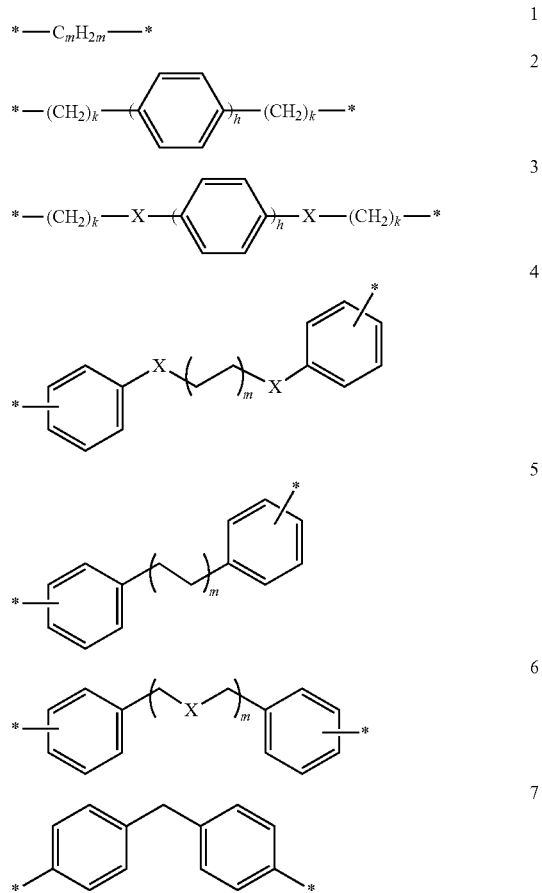

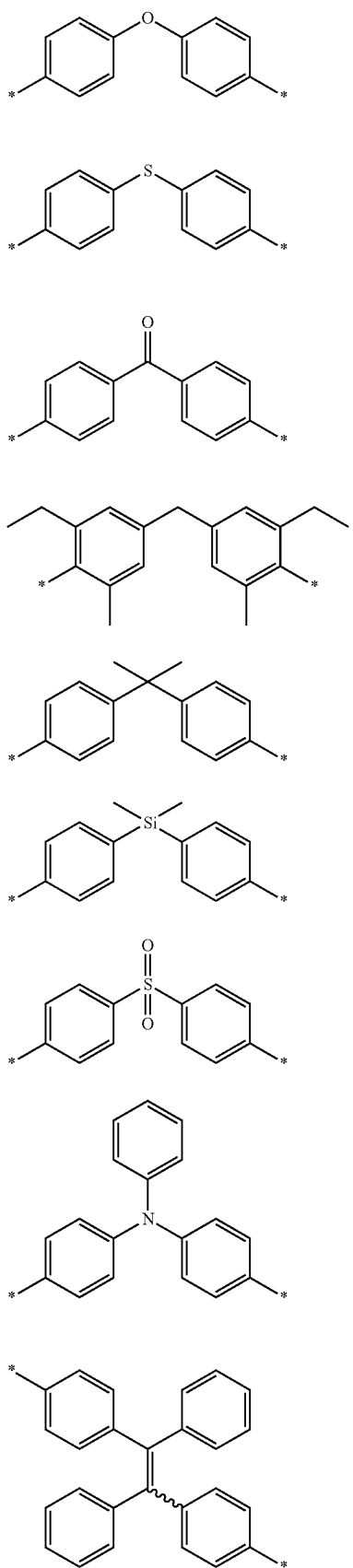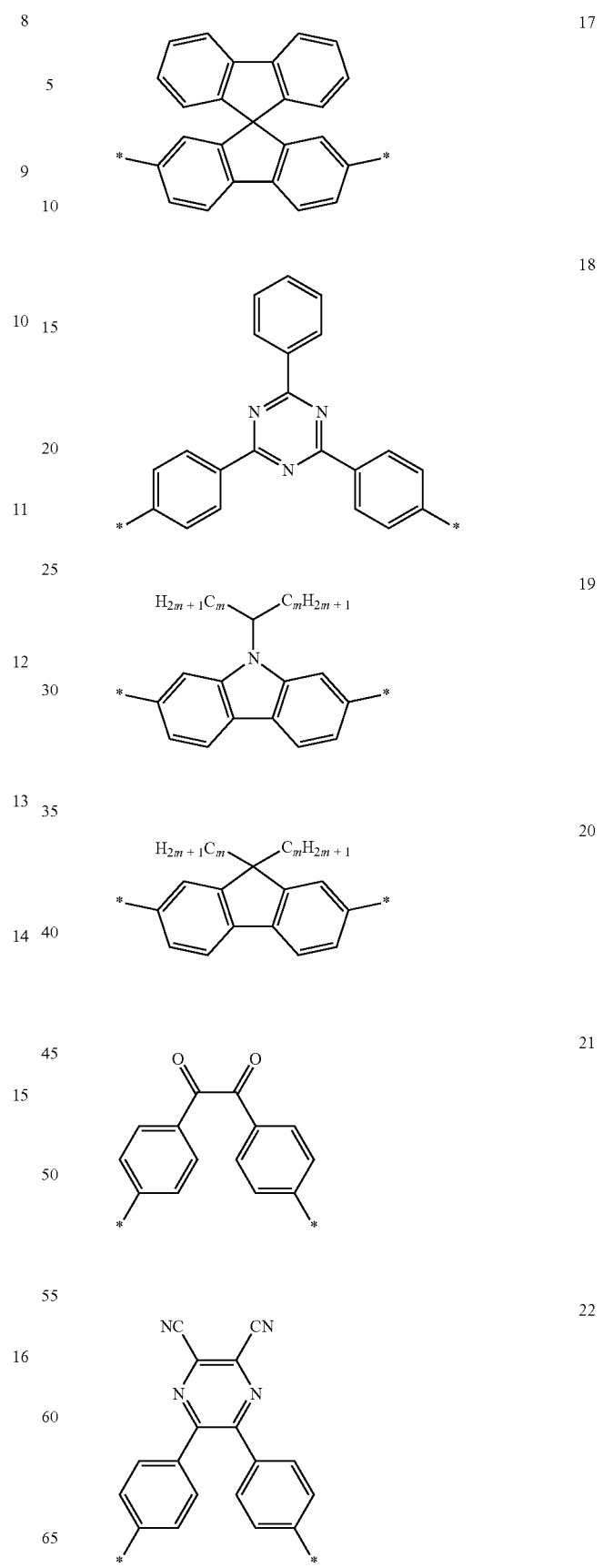

-continued

23
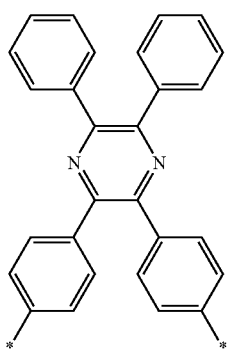

24
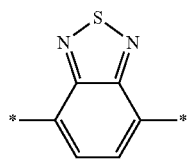

25
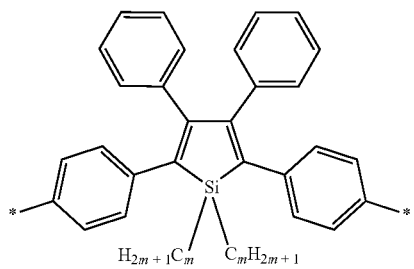

26
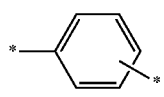

27
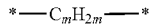

28

29

wherein m, h and k are an integer of 1-20; X is selected from the group consisting of the elements of N, P, O, S and Si; and * indicates a substitution location; and wherein the narrow range polyacetylene ester compound has a molecular weight distribution coefficient of 1.00-2.00.

2. A method for preparing the narrow-range polyacetylene ester compound according to claim 1, wherein the method comprises:

(1) under a carbon dioxide atmosphere with atmospheric pressure, a bifunctional alkyne monomer, carbon dioxide, and a dihalide monomer are polymerized by means of a combined action of a catalyzer and base in an organic solvent; and (2) after the reaction is completed, the product is added to a precipitant for precipitation, and the precipitate is collected and dried to a constant weight to obtain a narrow-range polyacetylene ester compound;

the bifunctional alkyne monomer has a structural formula as represented by formula

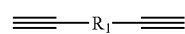 (II)

the dihalide monomer has a structural formula as represented by formula (III):

X—R$_2$—X  X=Cl, Br, I (III)

wherein R$_1$ and R$_2$ are an organic group;

wherein R$_1$ is any one of the following organic groups of 1 to 26, and R$_2$ is any one of the following organic groups of 27 to 29:

1
*—C$_m$H$_{2m}$—*

2
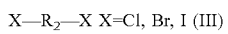

3

4

5

6
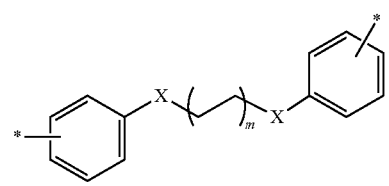

7
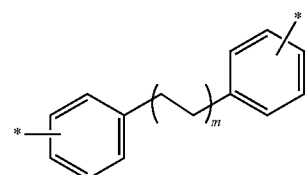

8
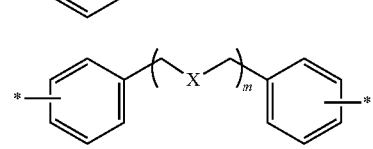

9
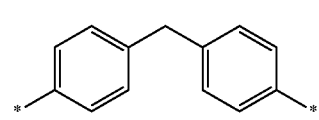

10
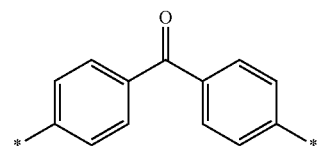

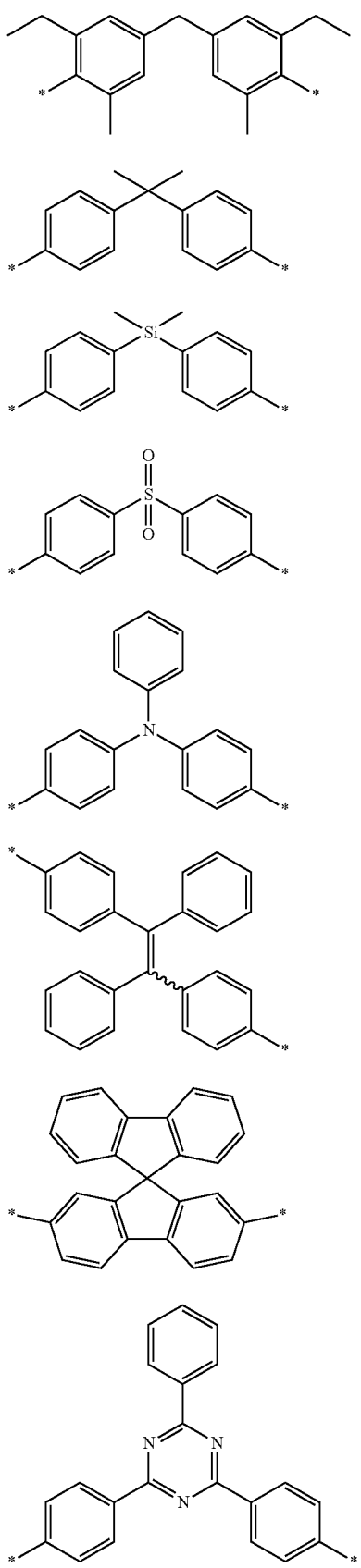
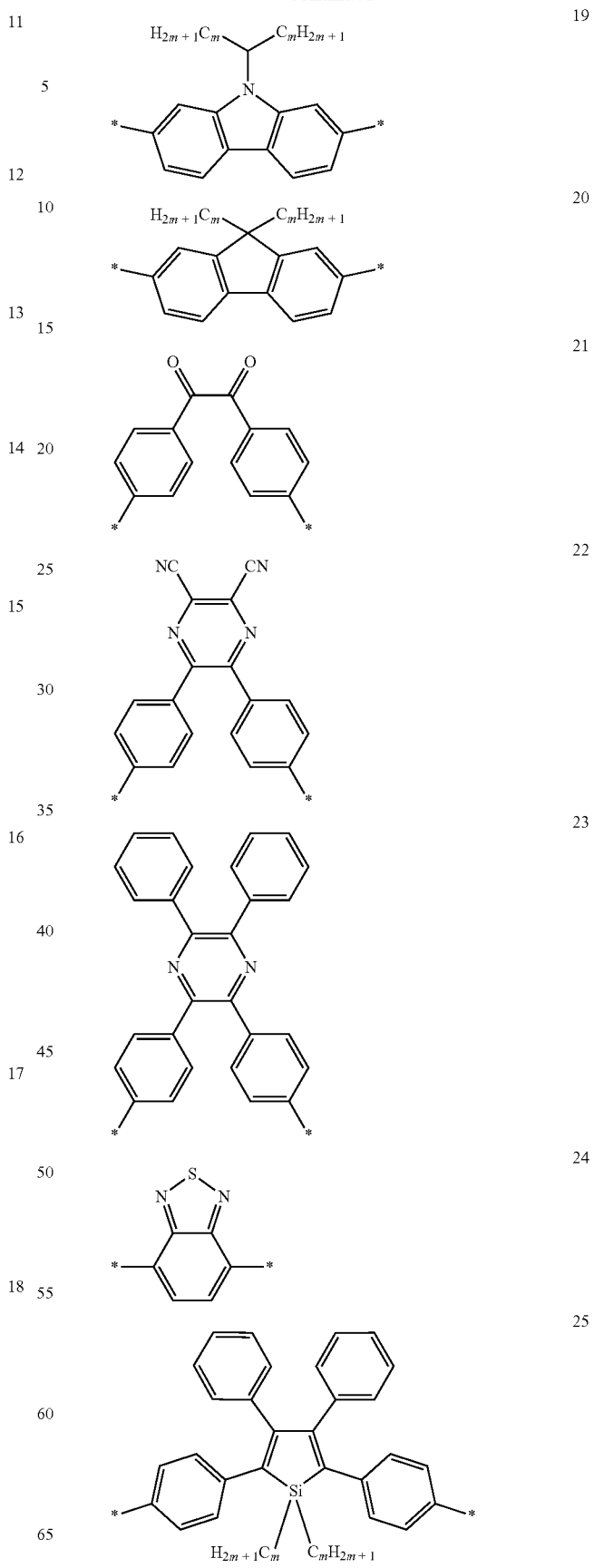

-continued

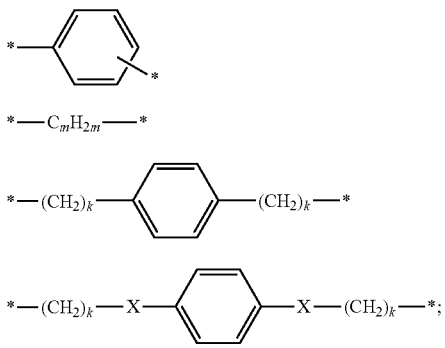

wherein m, h and k are an integer of 1-20; X is selected from the group consisting of the elements of N, P, O, S and Si; and * indicates a substitution location; and wherein the narrow-range polyacetylene ester compound has a molecular weight distribution coefficient of 1.00-2.00.

3. The method for preparing the narrow-range polyacetylene ester compound according to claim 2, wherein the organic solvent in step (1) is selected from the group consisting of tetrahydrofuran, dichloromethane, chloroform, toluene, 1,4-dioxane, dimethyl sulfoxide, N,N-dimethylformamide, N,N-dimethylacetamide, acetonitrile, ethanol, N-methylpyrrolidone, dimethyl carbonate, diethyl carbonate, ethylene carbonate, propylene carbonate, and mixtures thereof; and the precipitant described in the step (2) is methanol or n-hexane.

4. The method for preparing the narrow-range polyacetylene ester compound according to claim 2, wherein the catalyzer in the step (1) is at least one of silver tungstate, silver iodide, silver nitrate, silver tetrafluoroborate, silver chloride, silver bromide, silver oxide, silver acetate, cuprous chloride, cuprous bromide, iodide copper, cuprous cyanide, or cuprous oxide; and the base in step (1) is at least one of cesium carbonate, potassium carbonate, potassium hydroxide, sodium hydroxide, cesium fluoride, potassium fluoride, potassium t-butoxide, sodium t-butoxide, lithium t-butoxide, 1,5,7-triazabicyclo[4.4.0]non-5-ene, or cesium acetate.

5. The method for preparing the narrow-range polyacetylene ester compound according to claim 2, wherein the concentrations of the bifunctional alkyne monomer and the dihalide monomer in the organic solvent in the polymerization in step (1) are 0.05-5 mol/L, respectively.

6. The method for preparing the narrow-range polyacetylene ester compound according to claim 2, wherein the catalyzer is used in an amount of from 1% to 40% by mole of the difunctional alkyne monomer; and the base is used in an amount of from 100% to 1000% by mole of the difunctional alkyne monomer.

7. The method for preparing the narrow-range polyacetylene ester compound according to claim 2, wherein the polymerization is performed at a temperature of 0° C. to 200° C. for 0.25-72 h.

* * * * *